(12) United States Patent
Yao et al.

(10) Patent No.: US 11,756,725 B2
(45) Date of Patent: Sep. 12, 2023

(54) BOOSTED COUPLED INDUCTORS AND ASSOCIATED SYSTEMS AND METHODS

(71) Applicant: Maxim Integrated Products, Inc., San Jose, CA (US)

(72) Inventors: Di Yao, San Jose, CA (US); Alexandr Ikriannikov, San Jose, CA (US); Andrea Pizzutelli, Redwood City, CA (US); Thurein Soe Paing, Lafayette, CO (US)

(73) Assignee: Maxim Integrated Products, Inc., San Jose, CA (US)

( * ) Notice: Subject to any disclaimer, the term of this patent is extended or adjusted under 35 U.S.C. 154(b) by 166 days.

(21) Appl. No.: 17/321,476

(22) Filed: May 16, 2021

(65) Prior Publication Data

US 2021/0398743 A1  Dec. 23, 2021

Related U.S. Application Data

(60) Provisional application No. 63/040,783, filed on Jun. 18, 2020.

(51) Int. Cl.
| | |
|---|---|
| *H02M 3/04* | (2006.01) |
| *H01F 27/34* | (2006.01) |
| *H01F 27/24* | (2006.01) |
| *H01F 27/28* | (2006.01) |

(52) U.S. Cl.
CPC ........... *H01F 27/346* (2013.01); *H01F 27/24* (2013.01); *H01F 27/28* (2013.01); *H02M 3/04* (2013.01)

(58) Field of Classification Search
CPC ...... H01F 27/24; H01F 27/346; H01F 27/292; H01F 27/255; H01F 27/2823; H01F 27/2852; H01F 27/38; H01F 27/263; H01F 27/324; H01F 27/2804; H01F 27/28; H01F 27/2847; H01L 27/0288; H02M 1/083; H02M 1/12

See application file for complete search history.

(56) References Cited

U.S. PATENT DOCUMENTS

| | | |
|---|---|---|
| 9,019,063 B2 | 4/2015 | Ikriannikov |
| 10,396,684 B2 | 8/2019 | Mu et al. |
| 2008/0054874 A1* | 3/2008 | Chandrasekaran ..... H01F 38/02 323/362 |

(Continued)

OTHER PUBLICATIONS

Fast multi-phase trans-inductor voltage regulator, Technical Disclosure Commons, Defensive Publication Series, May 9, 2019, pp. 1-15.

*Primary Examiner* — Bryan R Perez
(74) *Attorney, Agent, or Firm* — PdZ Patent Law, PLLC

(57) ABSTRACT

A switching power converter includes a first switching stage, a second switching stage, a coupled inductor, and a boost winding. The coupled inductor includes a first phase winding, a second phase winding, and a magnetic core. The first phase winding is wound at least partially around a first portion of the magnetic core, and the first phase winding is electrically coupled to the first switching stage. The second phase winding is wound at least partially around a second portion of the magnetic core, and the second phase winding is electrically coupled to the second switching stage. The boost winding forms at least one turn such that mutual magnetic flux associated with each of the first and second phase windings flows through the at least one turn.

14 Claims, 21 Drawing Sheets

(56) References Cited

U.S. PATENT DOCUMENTS

2011/0169476 A1\* 7/2011 Ikriannikov .......... H01F 38/023
   323/362
2017/0263369 A1\* 9/2017 Gold .................... H01F 27/324

\* cited by examiner

BOOSTED COUPLED INDUCTORS AND ASSOCIATED SYSTEMS AND METHODS

RELATED APPLICATIONS

This application claims benefit of priority to U.S. Provisional Patent Application Ser. No. 63/040,783, filed on Jun. 18, 2020, which is incorporated herein by reference.

BACKGROUND

Two or more magnetically coupled inductors are often collectively referred to as a "coupled inductor" and have associated mutual inductance and leakage inductance. Mutual inductance is associated with magnetic coupling between windings, and mutual magnetic flux is magnetic flux generated by current flowing through one winding which couples to one or more other windings. Accordingly, the larger the mutual inductance, the stronger the magnetic coupling between windings. Leakage inductance, on the other hand, is associated with energy storage. Thus, the larger the leakage inductance, the more energy stored in the inductor. Leakage inductance results from leakage magnetic flux, which is magnetic flux generated by current flowing through one winding of the coupled inductor that is not coupled to any other winding of the coupled inductor.

DETAILED DESCRIPTION OF THE EMBODIMENTS

Disclosed herein are boosted coupled inductors and associated systems and methods. For example, certain embodiments include a coupled inductor with two or more phase windings, as well as a boost winding, to collectively form a boosted coupled inductor. The boost winding is magnetically coupled to each of the phase windings. In some embodiments, the boost winding forms at least one turn such that mutual magnetic flux associated with each phase winding flows through the turn of the boost winding, which advantageously also promotes strong coupling of leakage magnetic flux to the boost winding. The boosted coupled inductors may offer significant advantages, such as in power converter applications, as discussed below. Additionally, certain embodiments of the boosted coupled inductors are configured to promote ease of manufacturing and low cost, as also discussed below.

Figure 1:
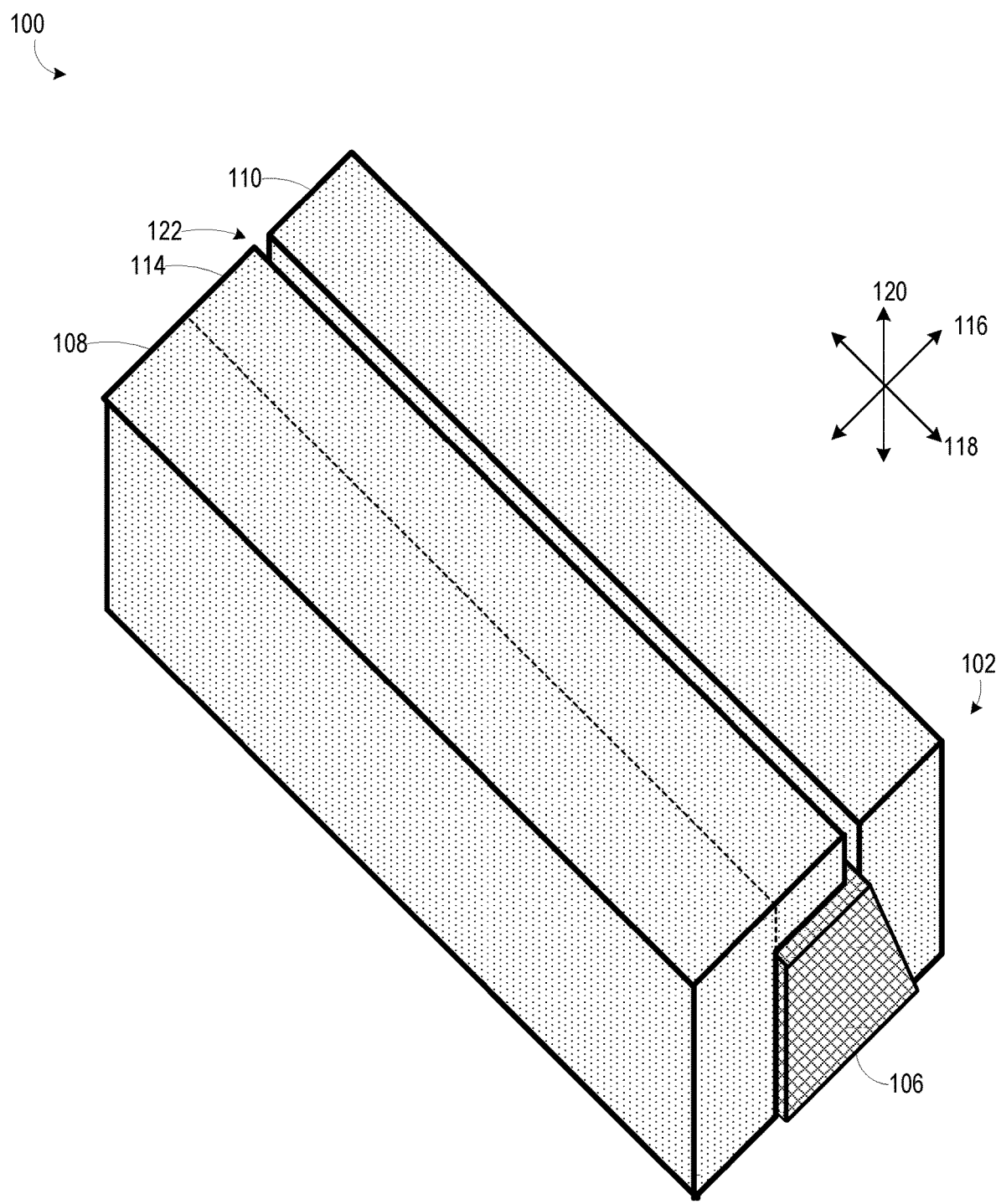
FIG. 1 is a perspective view of a boosted coupled inductor, according to an embodiment.
Figure 2:
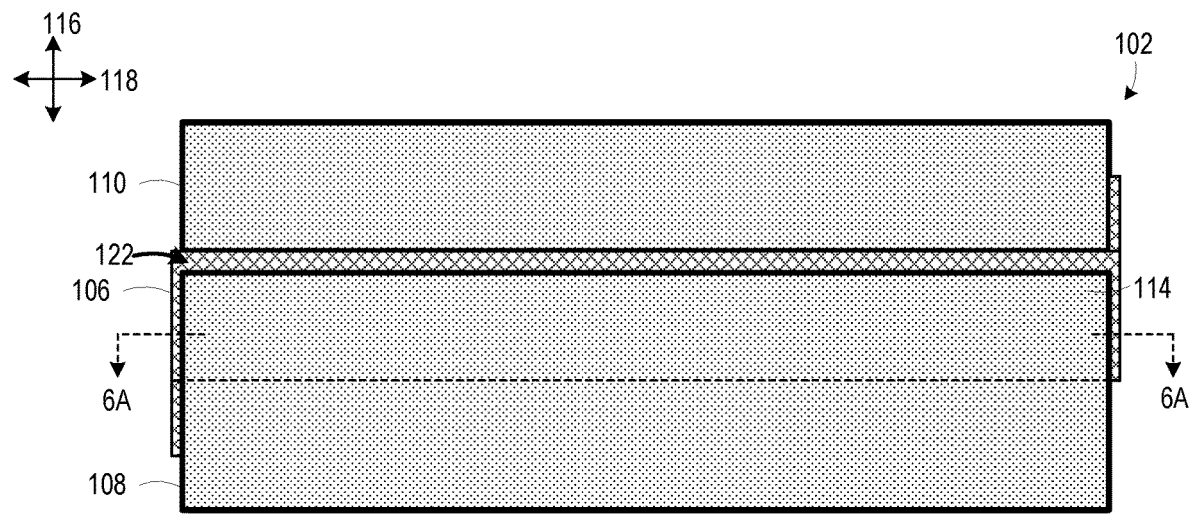
FIG. 2 is a top plan view of the FIG. 1 boosted coupled inductor.
Figure 3:
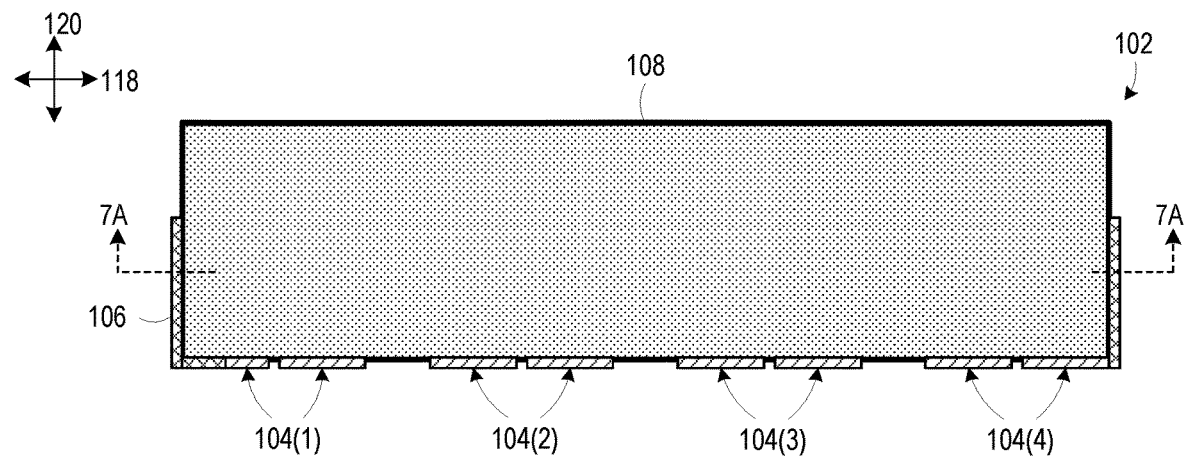
FIG. 3 is a front side elevational view of the FIG. 1 boosted coupled inductor.
Figure 4:
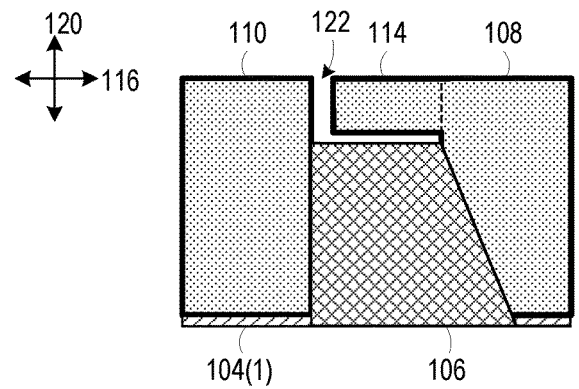
FIG. 4 is a left side elevational view of the FIG. 1 boosted coupled inductor.
Figure 5:
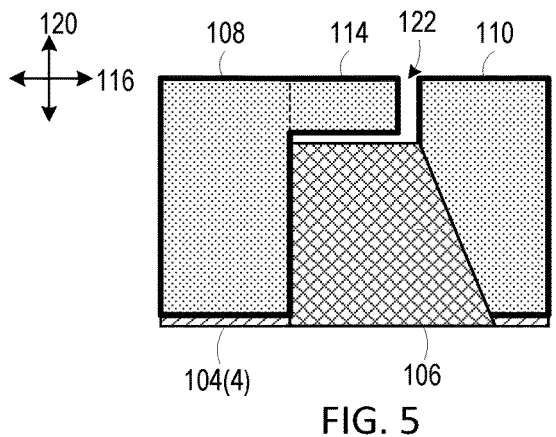
FIG. 5 is a right side elevational view of the FIG. 1 boosted coupled inductor.
Figure 6:
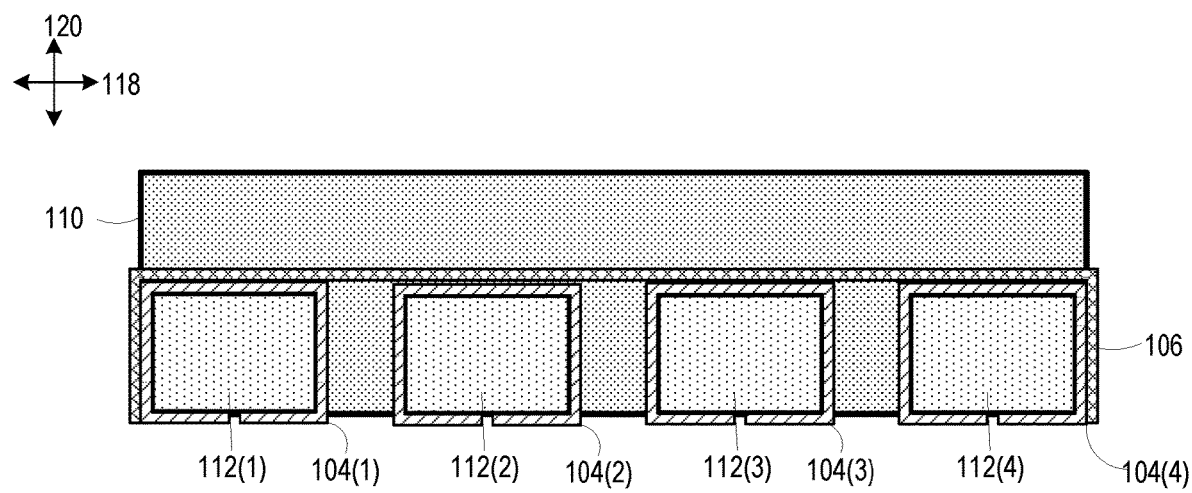
FIG. 6 is a cross-sectional view of the FIG. 1 boosted coupled inductor taken along line 6A-6A of FIG. 2.
Figure 7:
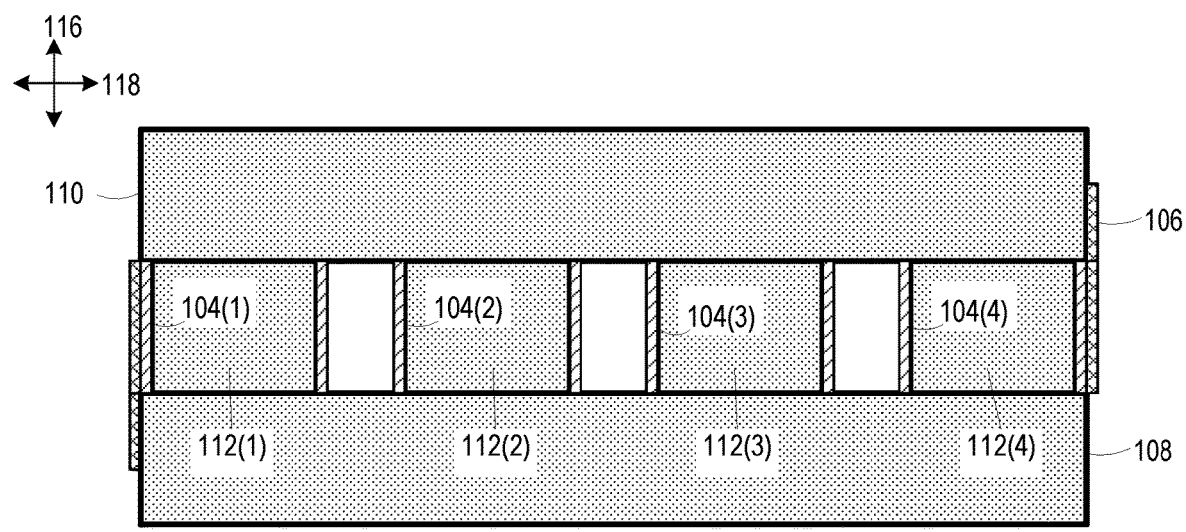
FIG. 7 is a cross-sectional view of the FIG. 1 boosted coupled inductor taken along line 7A-7A of FIG. 3.

FIG. 1 is a perspective view of a boosted coupled inductor 100, which is one embodiment of the new boosted coupled inductors. FIG. 2 is a top plan view of boosted coupled inductor 100, FIG. 3 is a front side elevational view of boosted coupled inductor 100, FIG. 4 is a left side elevational view of boosted coupled inductor 100, and FIG. 5 is a right side elevational view of boosted coupled inductor 100. FIG. 6 is a cross-sectional view of boosted coupled inductor 100 taken along line 6A-6A of FIG. 2, and FIG. 7 is a cross-sectional view of boosted coupled inductor 100 taken along line 7A-7A of FIG. 3. Boosted coupled inductor 100 includes a magnetic core 102, a plurality of phase windings 104, and a boost winding 106. In this document, specific instances of an item may be referred to by use of a numeral in parentheses (e.g., phase winding 104(1)) while numerals without parentheses refer to any such item (e.g., phase windings 104).

Magnetic core 102 is formed, for example, of a ferrite magnetic material. Magnetic core 102 includes a first rail 108, a second rail 110, a plurality of legs 112, and a leakage element 114. Although magnetic core 102 is illustrated as including four legs 112, magnetic core 102 could be modified to have any number of legs 112, as long as magnetic core 102 has at least two legs 112. Additionally, although the figures include dashed lines delineating leakage element 114 from first rail 108 to assist the viewer in distinguishing these elements, there need not be a discontinuity between first rail 108 and leakage element 114. The configuration of leakage element 114 could be modified without departing from the scope hereof. For example, leakage element 114 could be replaced with two leakage elements disposed at opposing ends of magnetic core 102, where each of the two leakage elements is disposed between first rail 108 and second rail 110 in direction 116. As another example, leakage element 114 could be replaced with multiple leakage elements disposed between legs 112 in direction 118.

First rail 108 and second rail 110 are separated from each other in a direction 116 (see FIGS. 2, 4, 5, and 7), and legs 112 are disposed between first rail 108 and second rail 110 in direction 116 (see FIGS. 6 and 7). Legs 112 are separated from each other in a direction 118, where direction 118 is orthogonal to direction 116. In some embodiments, legs 112 join first and second rails 108, 110 in direction 116, and in some other embodiments, legs 112 are separated from first rail 108 and/or second rail 110 by a respective gap (not shown), such as to help prevent saturation of magnetic core 102. Leakage element 114 is also disposed between first rail 108 and second rail 110 in direction 116, such that leakage element 114 is disposed over boost winding 106 in a direction 120, where direction 120 is orthogonal to each of directions 116 and 118. In some embodiments, leakage element 114 is attached to first rail 108, and leakage element 114 is separated from second rail 110 in direction 116 by a gap 122. Gap 122 includes, for example, air, plastic, paper, adhesive, or a magnetic material having a lower magnetic permeability than magnetic core 102.

A respective phase winding 104 is wound at least partially around each leg 112, and boost winding 106 is wound at least partially around all legs 112. Accordingly, each phase winding 104 is at least partially surrounded by boost winding 106, as seen when boosted coupled inductor 100 is viewed cross-sectionally in direction 116 (see, e.g., FIG. 6). Consequently, boost winding 106 is advantageously strongly magnetically coupled to each phase winding 104. Boost winding 106 is electrically isolated from phase windings 104. For example, in certain embodiments, phase windings 104 and/or boost winding 106 are coated with a dielectric material (not shown). As another example, in some embodiments, boost winding 106 is physically separated from phase windings 104.

Figure 8:
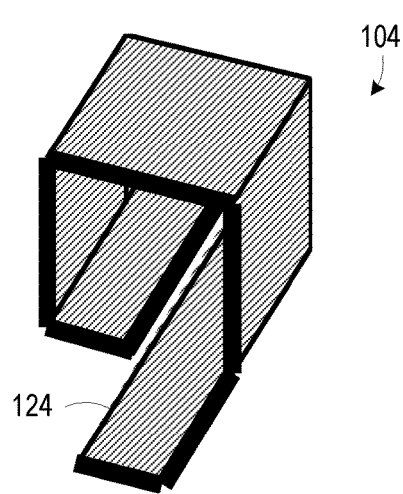
FIG. 8 is a perspective view of a phase winding of the FIG. 1 boosted coupled inductor.
Figure 9:
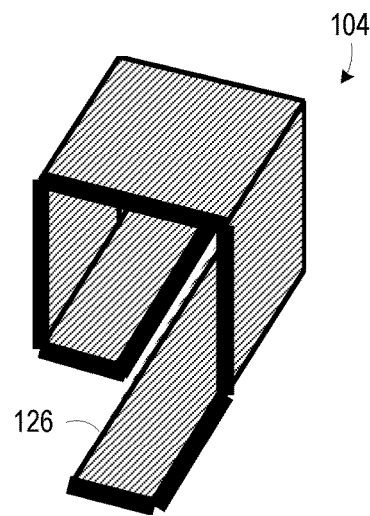
FIG. 9 is another perspective view of the phase winding of the FIG. 1 boosted coupled inductor.
Figure 10:
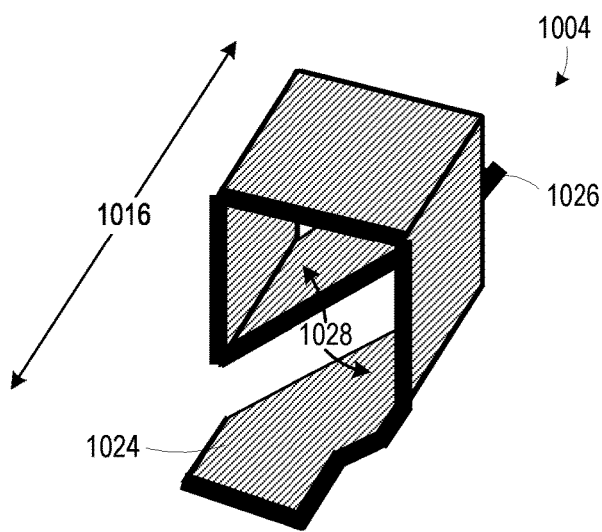
FIG. 10 is a perspective view of an alternate embodiment of the phase winding of the FIG. 1 boosted coupled inductor.

FIGS. 8 and 9 are different perspective views of a phase winding 104 instance, i. e. FIG. 9 shows phase winding 104 rotated 180 degrees with respect to the FIG. 8 view. Each phase winding 104 forms opposing solder tabs 124 and 126 at respective ends of the winding, as respectively shown in FIGS. 8 and 9. The configuration of phase windings 104 could vary without departing from the scope hereof. For example, phase windings 104 could be modified to have different solder tabs or even no solder tabs. As another example, phase windings 104 could be modified to form additional turns. As yet another example, FIG. 10 is a perspective view of a phase winding 1004, which is an alternate embodiment of phase winding 104. Phase winding 1004 forms opposing solder tabs 1024 and 1026 at respective ends of the winding. The FIG. 10 configuration may be particularly advantageous in applications where printed circuit board (PCB) mounting pads corresponding to solder tabs 1024 and 1026 are aligned in direction 1016.

Figure 11:
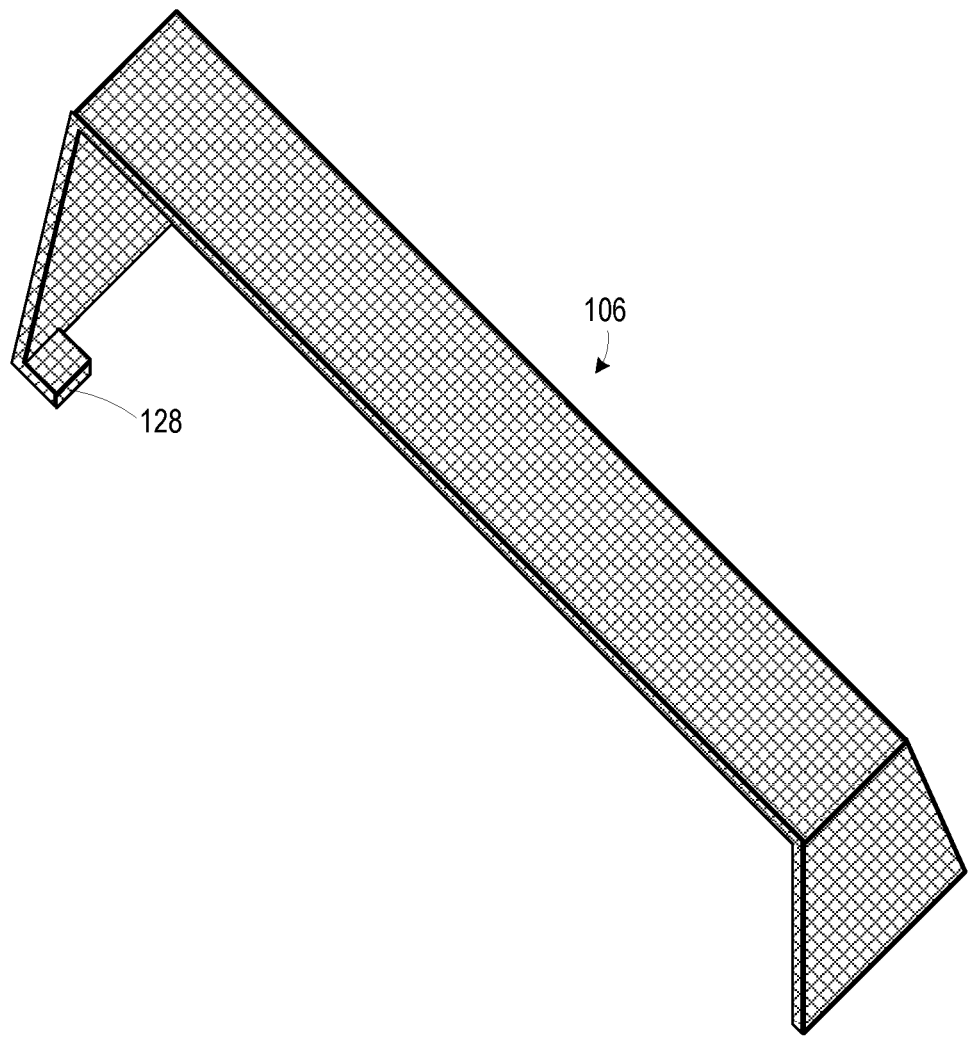
FIG. 11 is a perspective view of a boost winding of the FIG. 1 boosted coupled inductor.
Figure 12:
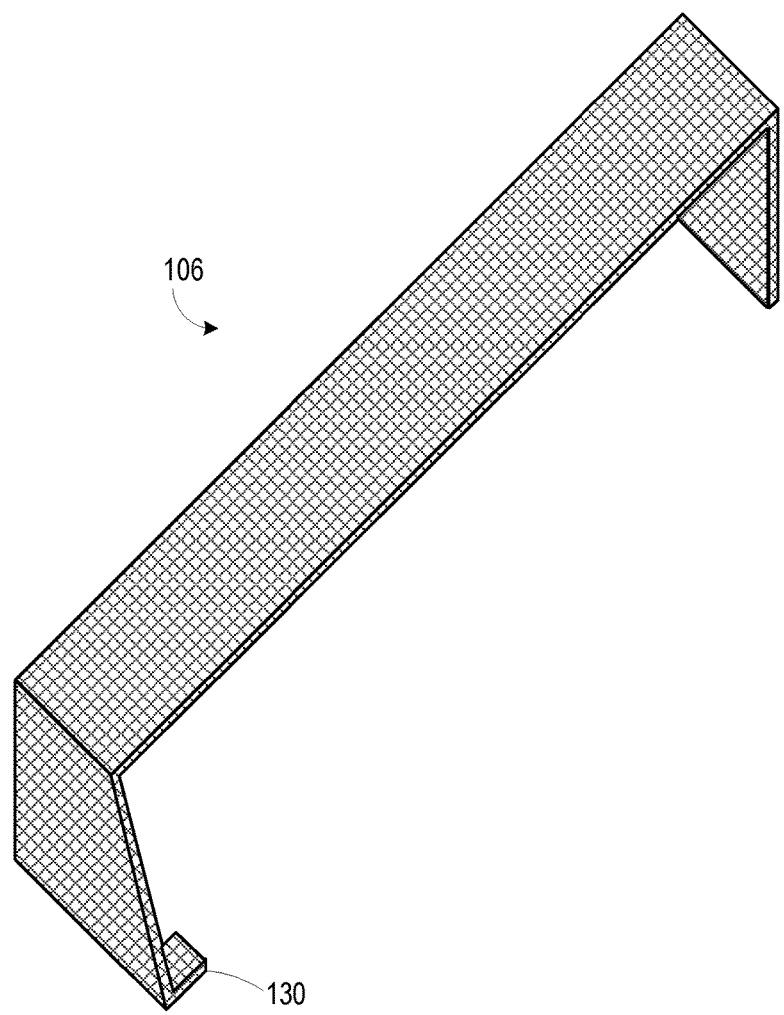
FIG. 12 is another perspective view of the boost winding of the FIG. 1 boosted coupled inductor.
Figure 13:
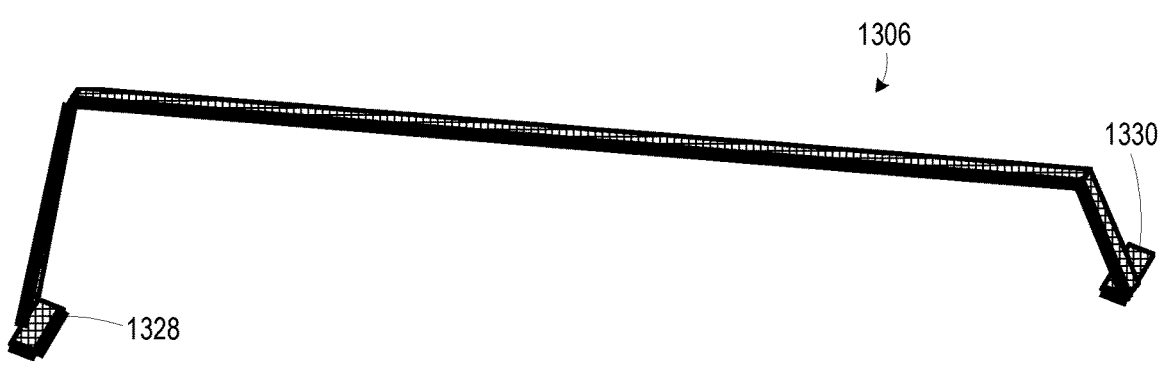
FIG. 13 is a perspective view of an alternate embodiment of the boost winding of the FIG. 1 boosted coupled inductor.

FIGS. 11 and 12 are different perspective views of boost winding 106. Boost winding 106 forms opposing solder tabs 128 and 130, as respectively shown in FIGS. 11 and 12. The configuration of boost winding 106 could vary without departing from the scope hereof. For example, boost winding 106 could be modified to have different solder tabs or even no solder tabs. As another example, boost winding 106 could be modified to form additional turns. As yet another example, FIG. 13 is a perspective view of a boost winding 1306, which is an alternate embodiment of boost winding 106. Boost winding 1306 forms opposing solder tabs 1328 and 1330. Boost winding 1306 has a higher direct current resistance (DCR) than boost winding 106, but the higher resistance may be acceptable in applications of boosted coupled inductor 100 where the boost winding carries relatively small current magnitude, such as a small alternating current (AC).

Figure 14:
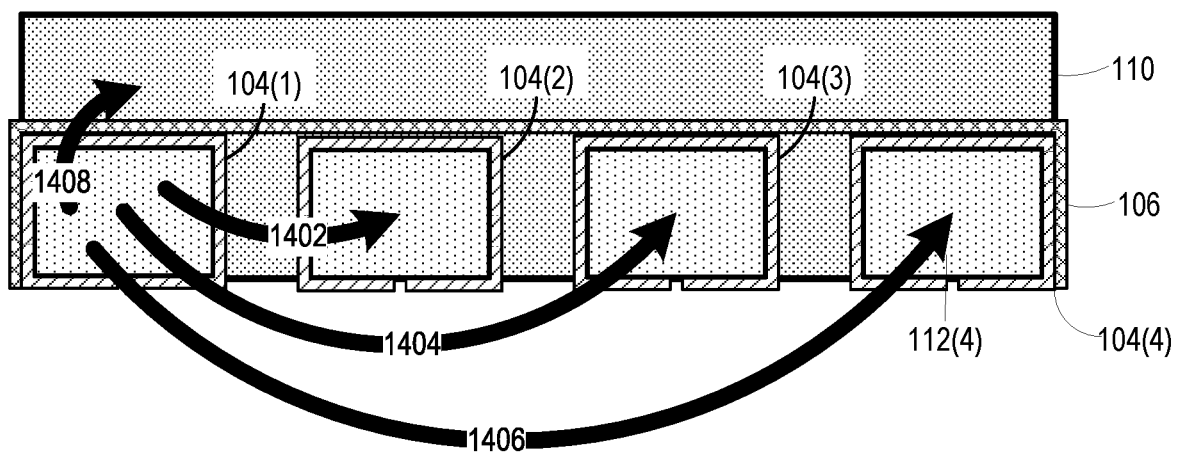
FIG. 14 is a cross-sectional view of the FIG. 1 boosted coupled inductor that is marked-up to symbolically show several mutual magnetic flux paths and one leakage magnetic flux path.

FIG. 14 is a cross-sectional view similar to FIG. 6, that is marked-up to symbolically show several mutual magnetic flux paths in boosted coupled inductor 100. Lines 1402, 1404, and 1406 represent mutual magnetic flux flowing from phase winding 104(1) to phase windings 104(2), 104(3), and 104(4), respectively. While not shown, there are additional mutual magnetic flux paths between other phase winding 104 instances. Although mutual magnetic flux from each phase winding 104 flows through the turn of boost winding 106, net mutual magnetic flux flowing through phase winding 104 may be zero in some applications, e.g. mutual magnetic flux from some phase windings 104 may cancel mutual magnetic flux from other phase windings 104 in boost winding 106, such that boost winding 106 "sees" zero mutual magnetic flux.

Figure 15:
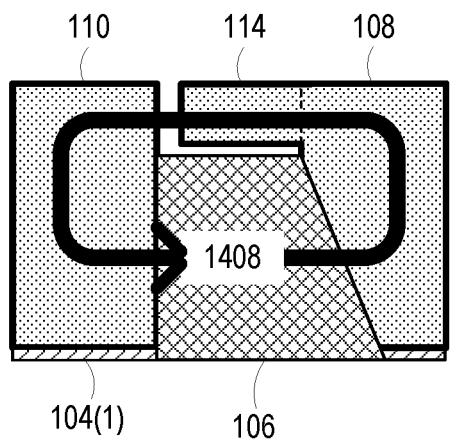
FIG. 15 is a left side elevational view of the FIG. 1 boosted coupled inductor that is marked-up to symbolically show another view of the leakage magnetic flux path illustrated in FIG. 14.

FIG. 14 also includes a line 1408 representing leakage magnetic flux associated with phase winding 104(1). FIG. 15 is left side elevational view similar to FIG. 4 that is marked-up to show another view of the FIG. 14 leakage magnetic flux path. As evident from FIGS. 14 and 15, leakage magnetic flux associated with phase winding 104(1) flows through first rail 108, leakage element 114, and second rail 110, and then back to phase winding 104(1). Thus, this leakage flux flows through the turn of boost winding 106. Leakage flux associated with other phase winding 104 instances also flows through the turn of boost winding 106 along analogous paths. Consequently, boost winding 106 is strongly magnetically coupled to leakage magnetic flux associated with phase windings 104, thereby promoting high performance of boosted coupled inductor 100. The fact that boost winding 106 is within mutual magnetic flux paths helps maximize leakage magnetic flux coupling to boost winding 106, by reducing potential for leakage magnetic flux to escape from magnetic core 102 before coupling to boost winding 106.

Additionally, it should be noted that a single boost winding, i.e. boost winding 106, is magnetically coupled to all phase winding 104 instances, thereby eliminating the need for additional windings to magnetically couple to phase windings 104. Such use of a single boost winding for magnetically coupling to all phase windings 104 promotes low cost of boosted coupled inductor 100 and ease of its manufacture. Furthermore, the configuration of boosted coupled inductor 100 may facilitate PCB layout in switching power converter applications of boosted coupled inductor 100, such as by enabling each switching stage electrically coupled to a respective phase winding 104 to be placed on a common side of boosted coupled inductor 100, as well as by eliminating the need to connect multiple boost winding instances. Moreover, the fact that each phase winding 104 is at least partially surrounded by boost winding 106, as discussed above, promotes electromagnetic compatibility of boosted coupled inductor 100 with other circuitry because boost winding 106 potentially blocks noise associated with switching currents flowing through phase windings 104 from radiating from boosted coupled inductor 100.

Figure 16:
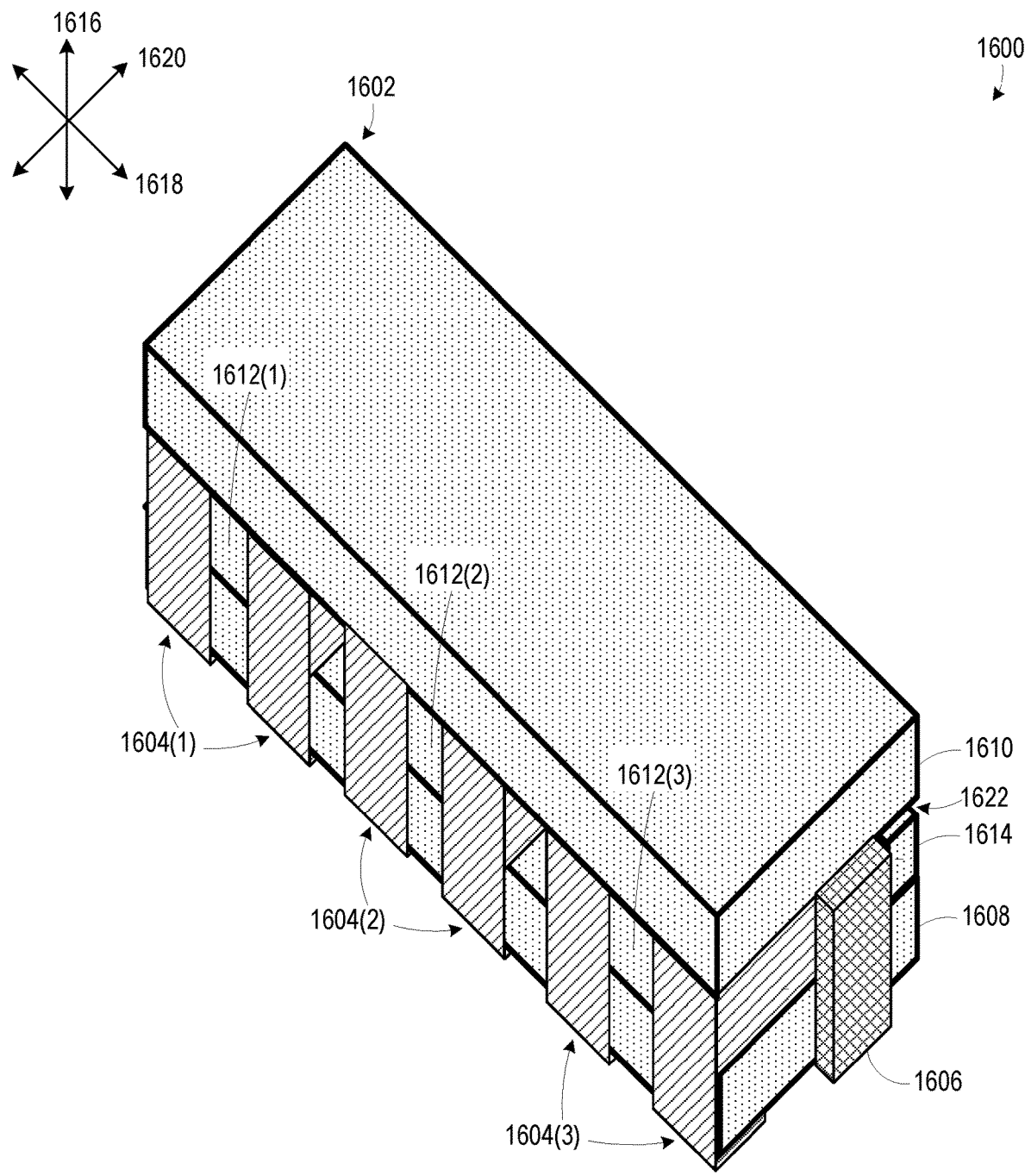
FIG. 16 is a perspective view of another boosted coupled inductor, according to an embodiment.
Figure 17:
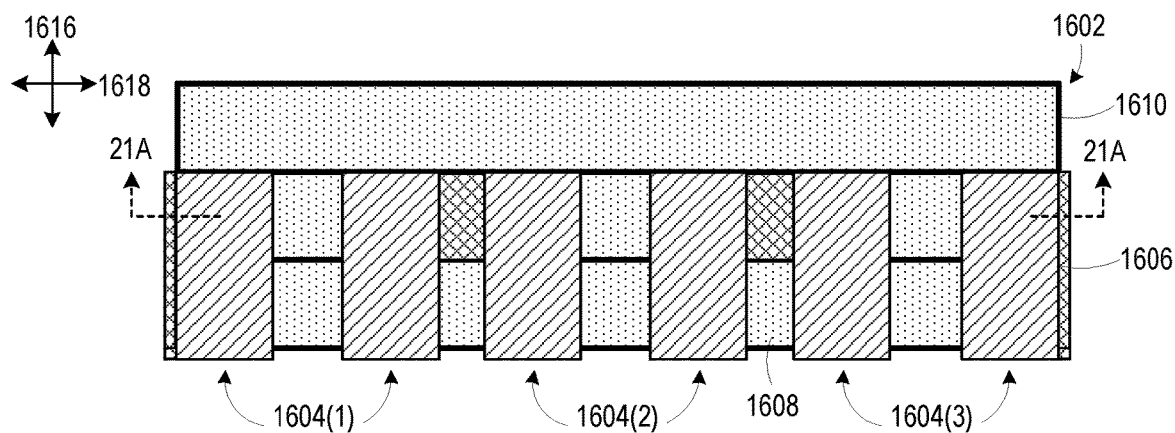
FIG. 17 is a front side elevational view of the FIG. 16 boosted coupled inductor.
Figure 18:
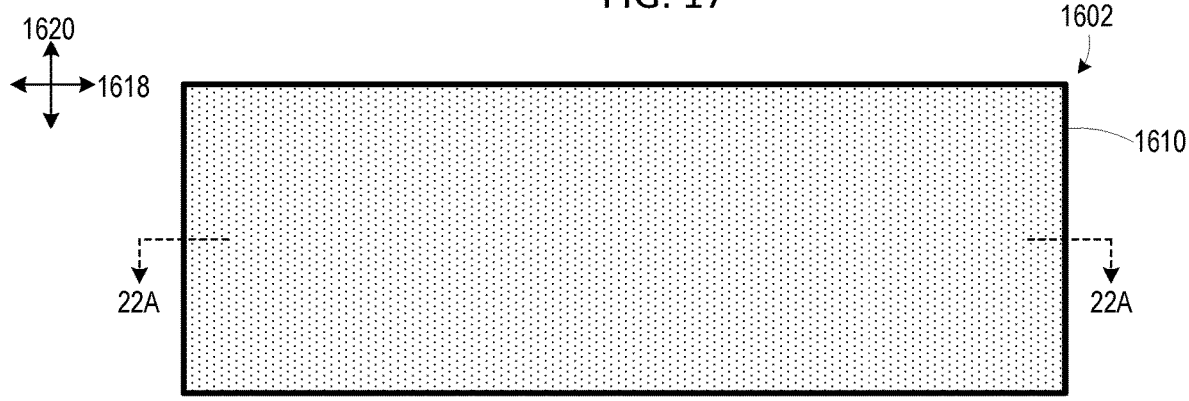
FIG. 18 is a top plan view of the FIG. 16 boosted coupled inductor.
Figures 19, 20:
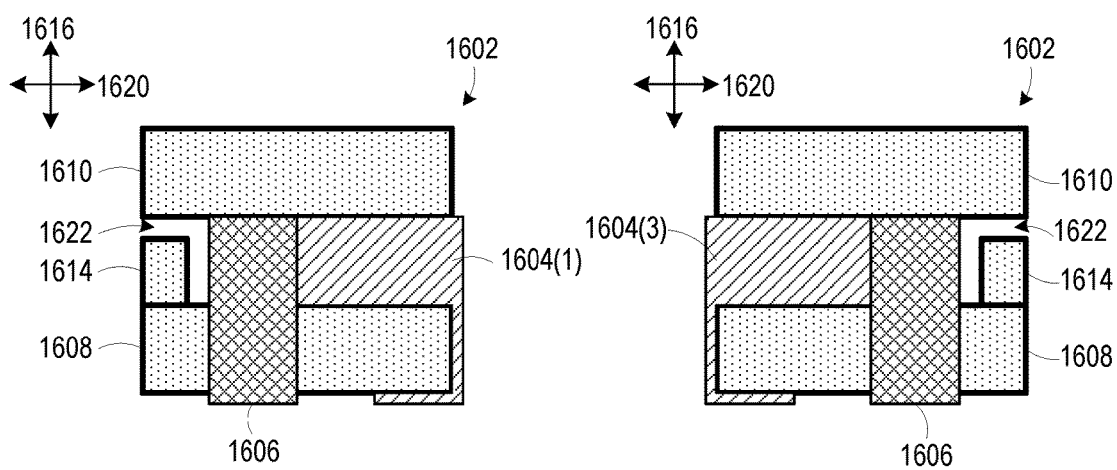
FIG. 19 is a left side elevational view of the FIG. 16 boosted coupled inductor.
FIG. 20 is a right side elevational view of the FIG. 16 boosted coupled inductor.
Figure 21:
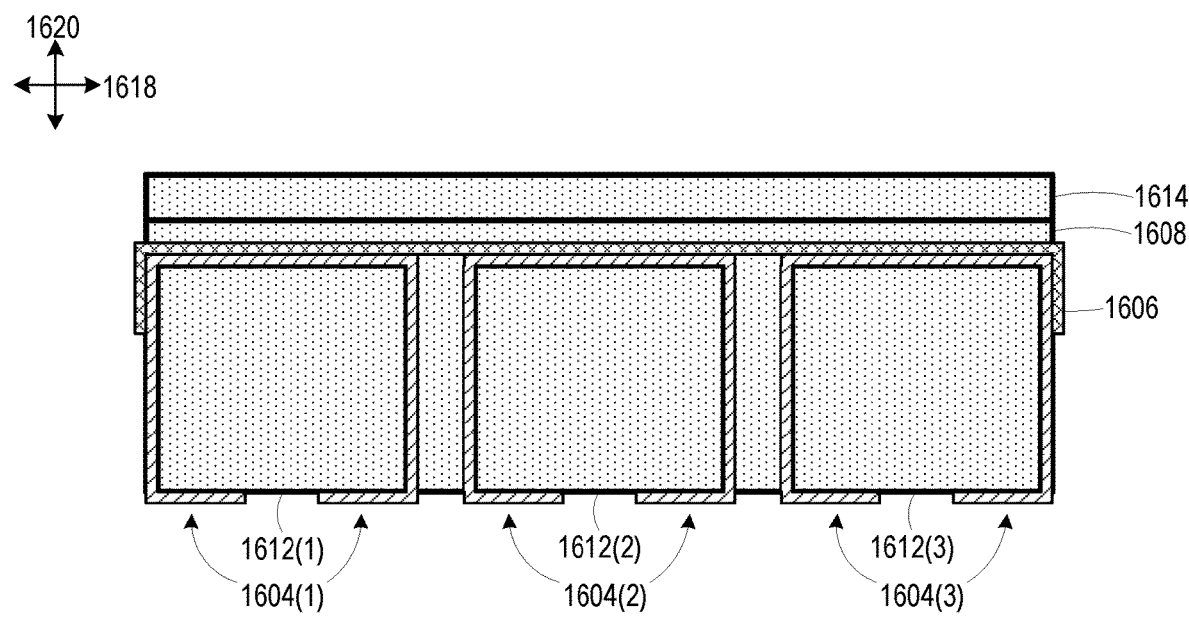
FIG. 21 is a cross-sectional view of the FIG. 16 boosted coupled inductor taken along line 21A-21A of FIG. 17.
Figure 22:
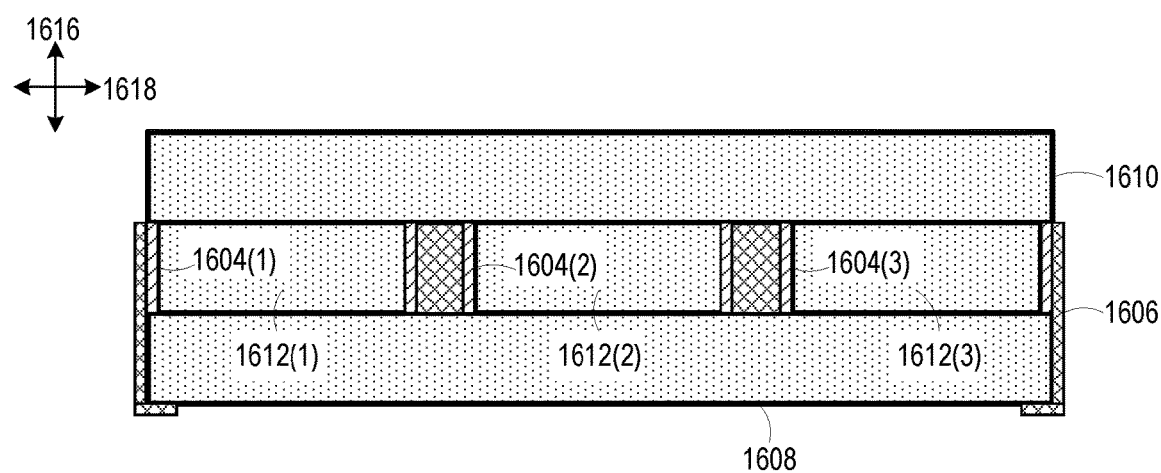
FIG. 22 is a cross-sectional view of the FIG. 16 boosted coupled inductor taken along line 22A-22A of FIG. 18.

FIG. 16 is a perspective view of a boosted coupled inductor 1600, which is another embodiment of the new boosted coupled inductors. FIG. 17 is a front side elevational view of boosted coupled inductor 1600, FIG. 18 is a top plan view of boosted coupled inductor 1600, FIG. 19 is a left side elevational view of boosted coupled inductor 1600, and FIG. 20 is a right side elevational view of boosted coupled inductor 1600. FIG. 21 is a cross-sectional view of boosted coupled inductor 1600 taken along line 21A-21A of FIG. 17, and FIG. 22 is a cross-sectional view of boosted coupled inductor 1600 taken along line 22A-22A of FIG. 18. Boosted coupled inductor 1600 includes a magnetic core 1602, a plurality of phase windings 1604, and a boost winding 1606.

Magnetic core 1602 is formed, for example, of a ferrite magnetic material. Magnetic core 1602 includes a first rail 1608, a second rail 1610, a plurality of legs 1612, and a leakage element 1614. Although magnetic core 1602 is illustrated as including three legs 1612, magnetic core 1602 could be modified to have any number of legs 1612, as long as magnetic core 1602 has at least two legs 1612. First rail 1608 and second rail 1610 are separated from each other in a direction 1616, and legs 1612 are disposed between first rail 1608 and second rail 1610 in direction 1616. Legs 1612 are separated from each other in a direction 1618, where direction 1618 is orthogonal to direction 1616. In some embodiments, legs 1612 join first and second rails 1608, 1610 in direction 1616, and in some other embodiments, legs 1612 are separated from first rail 1608 and/or second rail 1610 by a respective gap (not shown), such as to help prevent saturation of magnetic core 1602. Leakage element 1614 is also disposed between first rail 1608 and second rail 1610 in direction 1616, such that leakage element 1614 is disposed over boost winding 1606 in a direction 1620, where direction 1620 is orthogonal to each of directions 1616 and 1618. In some embodiments, leakage element 1614 is attached to first rail 1608, and leakage element 1614 is separated from second rail 1610 in direction 1616 by a gap 1622. Gap 1622 includes, for example, air, plastic, paper, adhesive, or a magnetic material having a lower magnetic permeability than magnetic core 1602.

Figure 23:
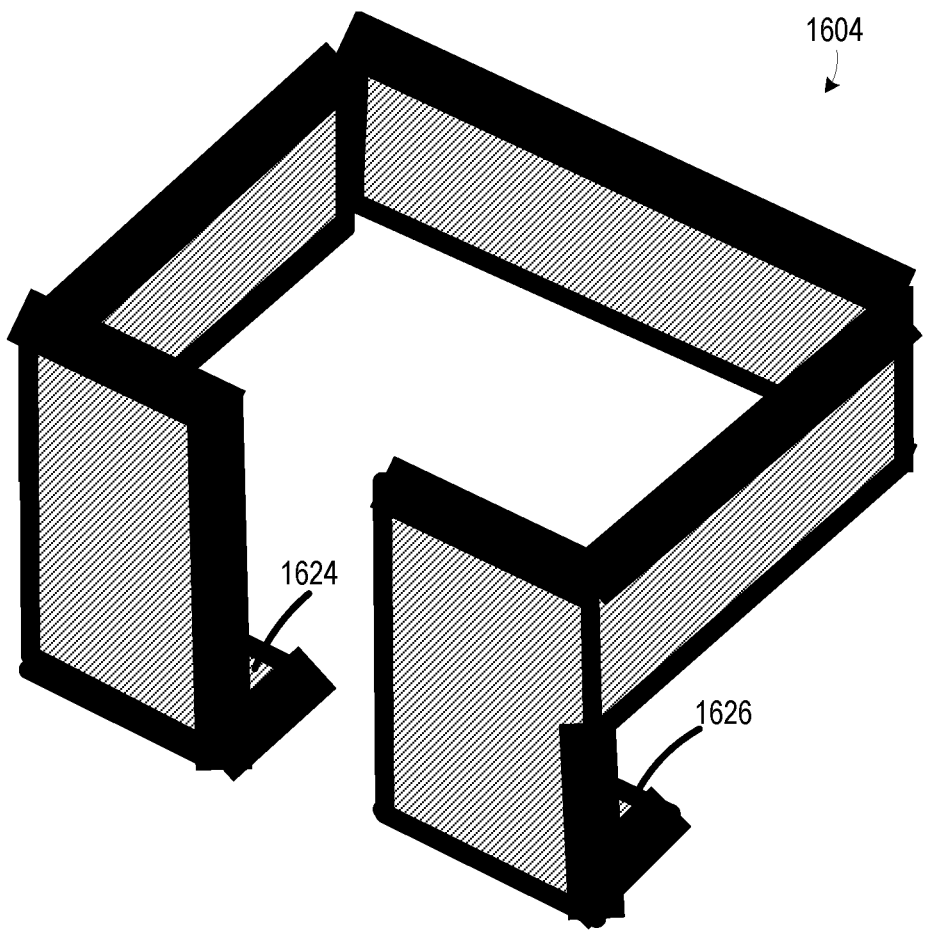
FIG. 23 is a perspective view of a phase winding of the FIG. 16 boosted coupled inductor.

A respective phase winding 1604 is wound at least partially around each leg 1612. Accordingly, each phase winding 1604 is at least partially surrounded by boost winding 1606, as seen when boosted coupled inductor 1600 is viewed cross-sectionally in direction 1620 (see, e.g., FIGS. 21 and 22). Consequently, boost winding 1606 is strongly magnetically coupled to each phase winding 1604. Additionally, mutual magnetic flux and leakage magnetic flux generated by current flowing through phase windings 1604 flows through the turn formed by boost winding 1606, in a manner analogous to that discussed above with respect to boosted coupled inductor 100. Boosted coupled inductor 1600 additionally achieves the advantages discussed above with respect to boosted coupled inductor 100. FIG. 23 is a perspective view of a phase winding 1604 instance. Each phase winding 1604 forms solder tabs 1624 and 1626 at opposing winding ends. The configuration of phase windings 1604 could vary without departing from the scope hereof. For example, phase windings 1604 could be modified to have different solder tabs or even no solder tabs. As another example, phase windings 1604 could be modified to form additional turns.

Figure 24:
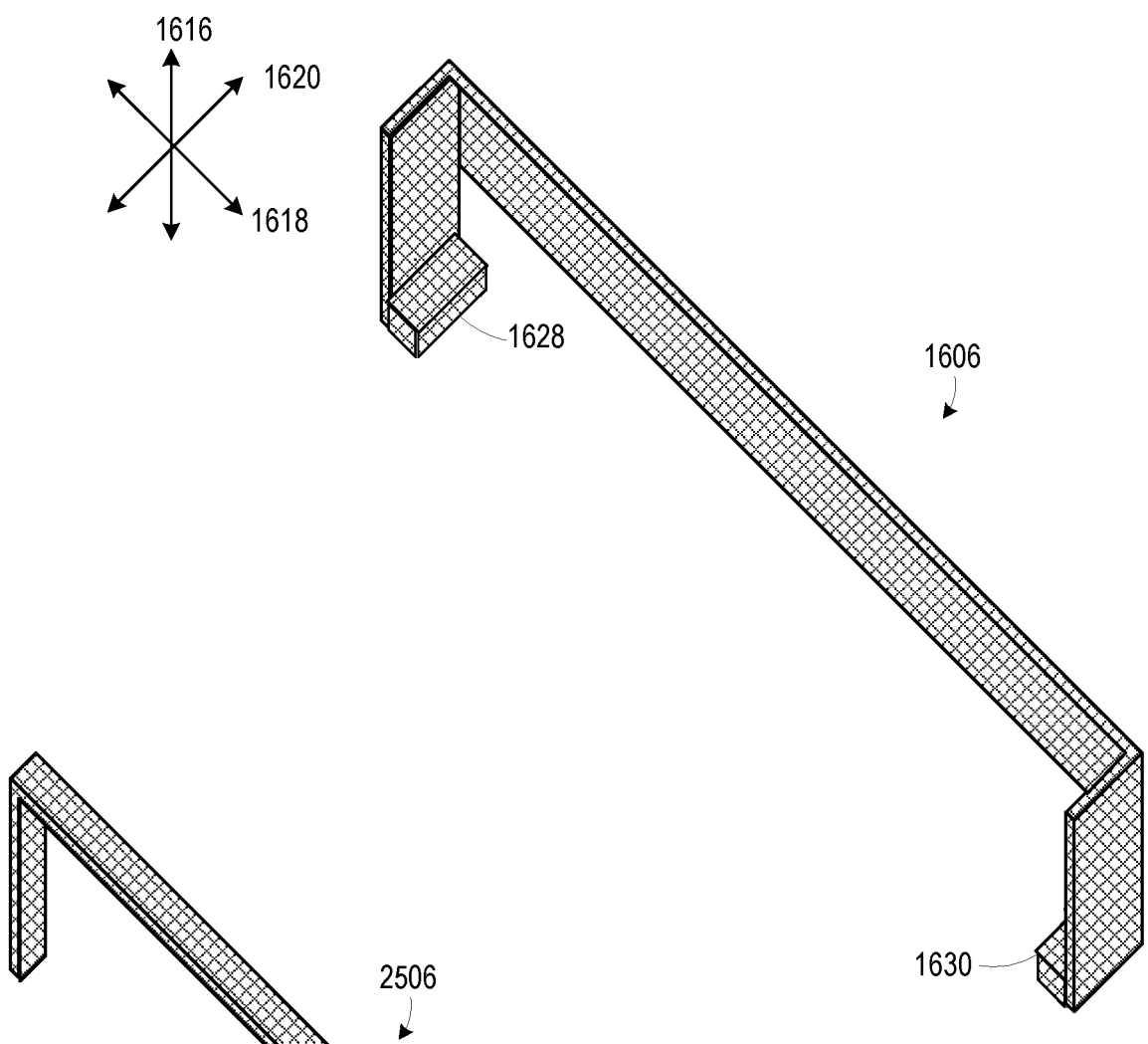
FIG. 24 is a perspective view of a boost winding of the FIG. 16 boosted coupled inductor.
Figure 25:
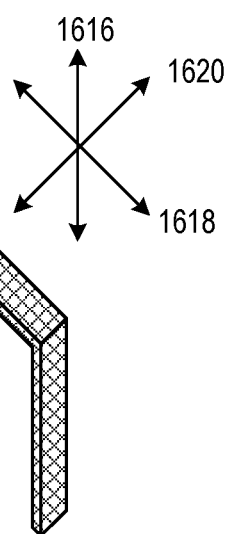
FIG. 25 is a perspective view of an alternate embodiment of the boost winding of the FIG. 16 boosted coupled inductor.

FIG. 24 is a perspective view of boost winding 1606. Boost winding 1606 forms opposing solder tabs 1628 and 1630. The configuration of boost winding 1606 could vary without departing from the scope hereof. For example, boost winding 1606 could be modified to have different solder tabs or even no solder tabs. As another example, boost winding 1606 could be modified to form additional turns. As yet another example, FIG. 25 is a perspective view of boost winding 2506, which is an alternate embodiment of boost winding 1606. Boost winding 2506 is not as tall as boost winding 1606 in direction 1616, which may be advantageous in height-restricted applications.

Figure 26:
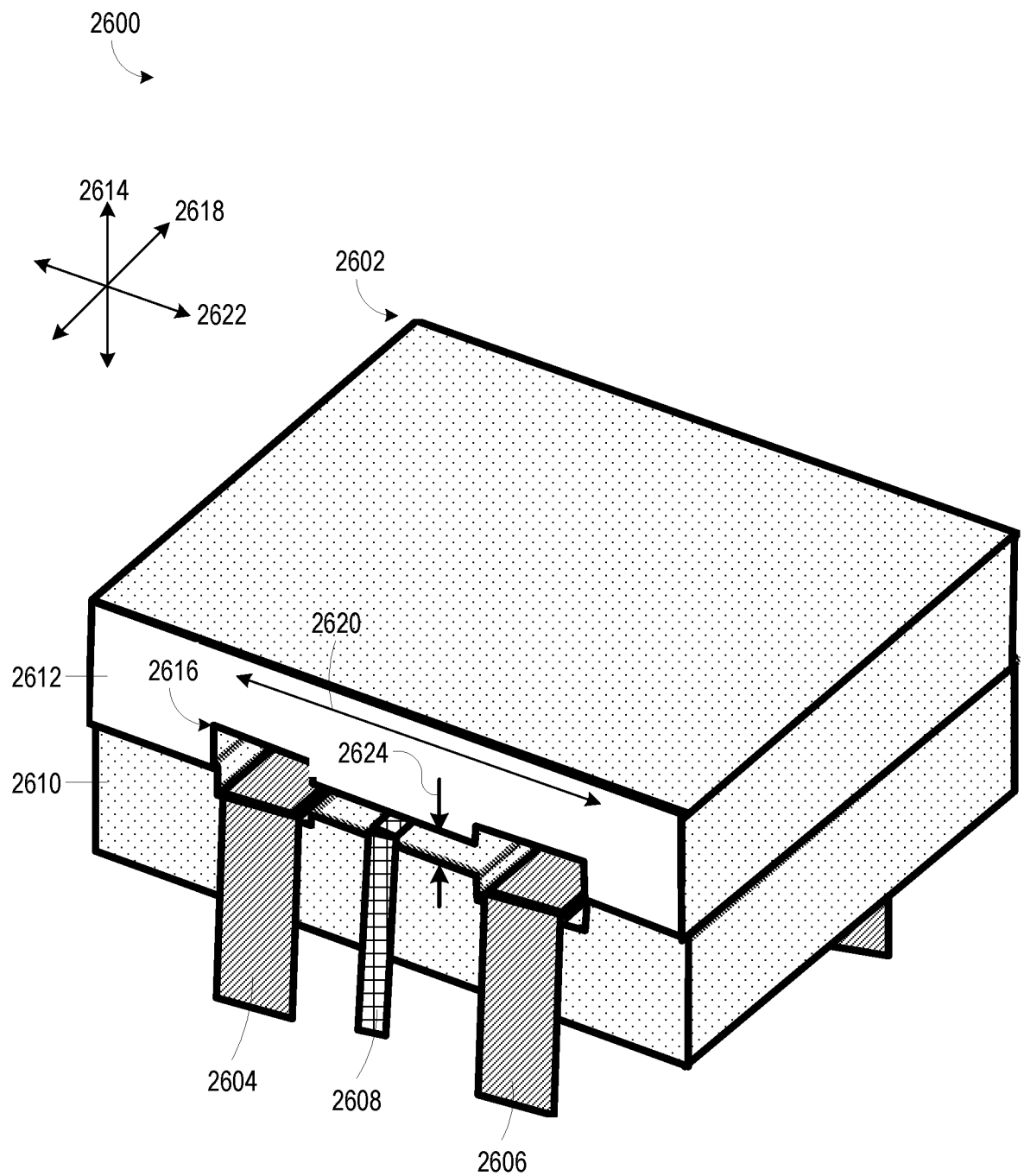
FIG. 26 is a perspective view of another boosted coupled inductor, according to an embodiment.

FIG. 26 is a perspective view of a boosted coupled inductor 2600, which is another embodiment of the new boosted coupled inductors. Boosted coupled inductor 2600 includes a magnetic core 2602, a first phase winding 2604, a second phase winding 2606, and a boost winding 2608.

Figure 27:
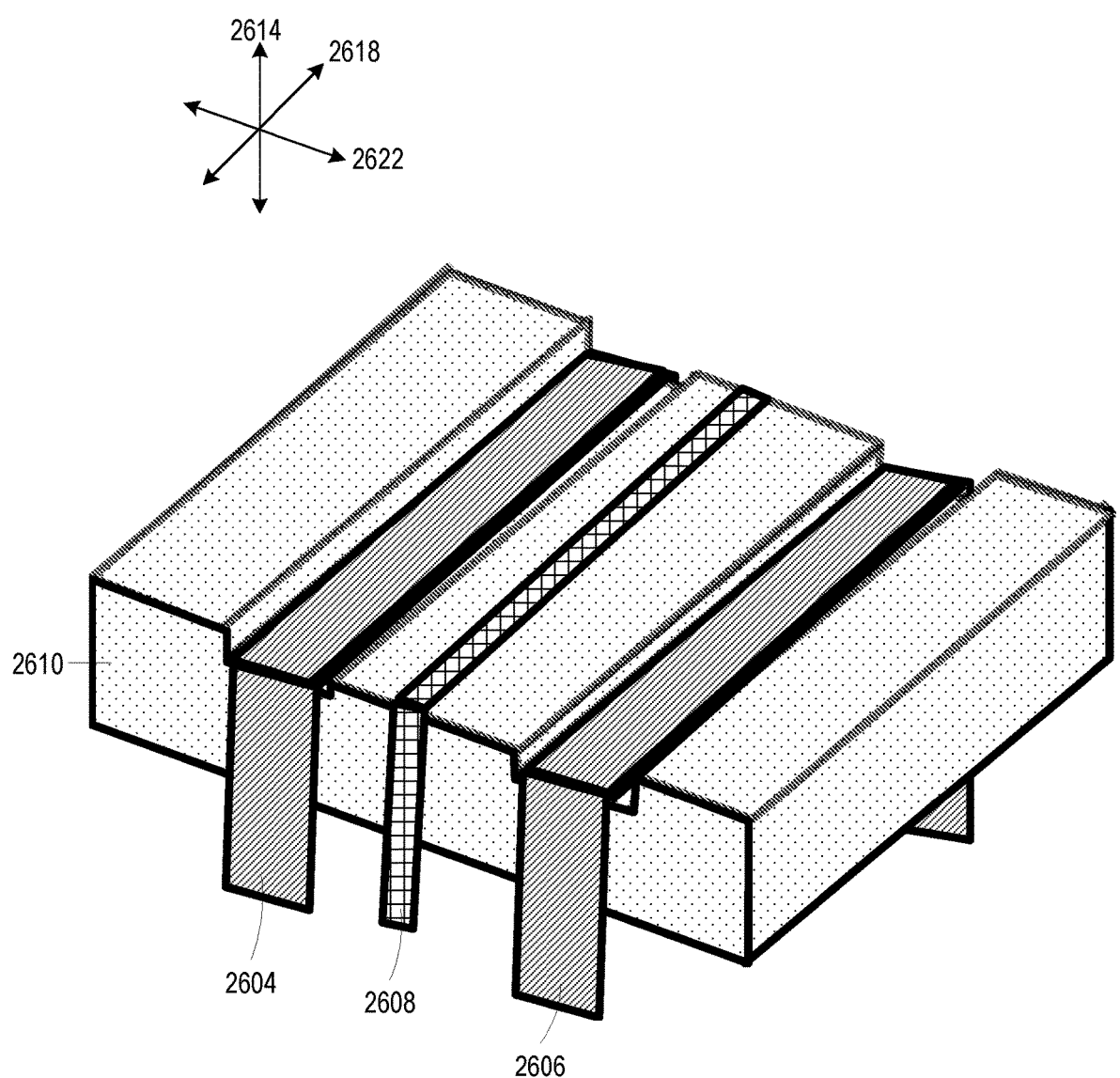
FIG. 27 is perspective view of the FIG. 26 boosted coupled inductor with an element of the magnetic core omitted.

Magnetic core 2602 is formed, for example, of a ferrite magnetic material. Magnetic core 2602 includes a first element 2610 and a second element 2612 stacked in a direction 2614. FIG. 27 is a perspective view of boosted coupled inductor 2600 with second element 2612 removed to show an interior of boosted coupled inductor 2600. Magnetic core 2602 forms a passageway 2616 extending through magnetic core 2602 in a direction 2618, where direction 2618 is orthogonal to direction 2614. Passageway 2616 has a width 2620 in a direction 2622, where direction 2622 is orthogonal to each of directions 2614 and 2618. Magnetic core 2602 could be formed of a single element, or magnetic core 2602 could be formed of three of more elements, without departing from the scope hereof.

Each of first phase winding 2604, second phase winding 2606, and boost winding 2608 are wound through passageway 2616. Second phase winding 2606 is separated from first phase winding 2604 in direction 2622, and boost winding 2608 is disposed between first phase winding 2604 and second phase winding 2606 in direction 2622. In some embodiments, each of first phase winding 2604, second phase winding 2606, and boost winding 2608 is a staple style winding. Passageway 2616 has a height 2624 in direction 2614. In some embodiments, height 2624 varies along width 2620. For example, in certain embodiments, height 2624 at the boost winding 2608 is less than height 2624 each of the first and second phase windings 2604 and 2606, to achieve requisite leakage inductance values.

Figure 28:
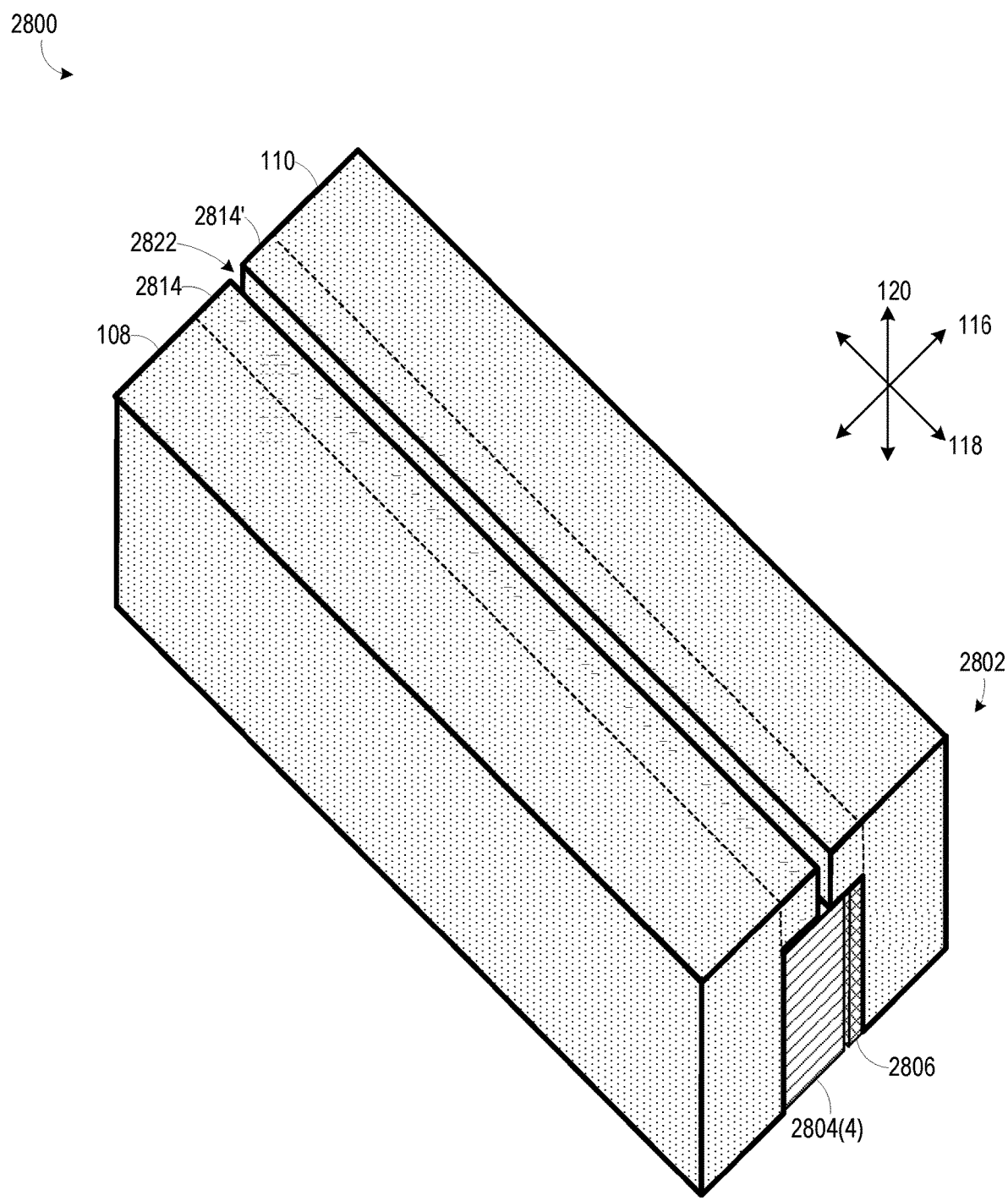
FIG. 28 is a perspective view of an alternate embodiment of the FIG. 1 boosted coupled inductor.
Figure 29:
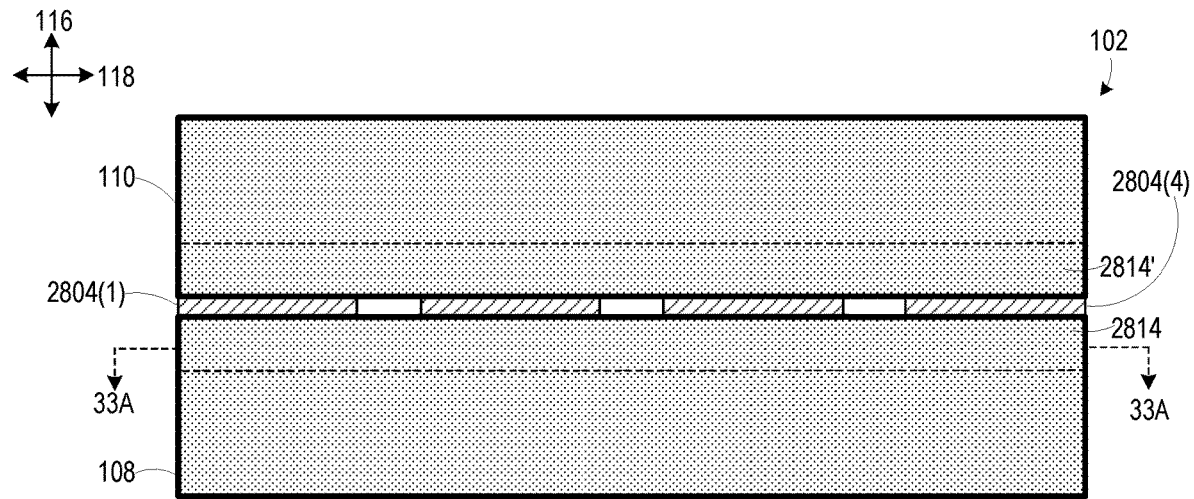
FIG. 29 is a top plan view of the FIG. 28 boosted coupled inductor.
Figure 30:
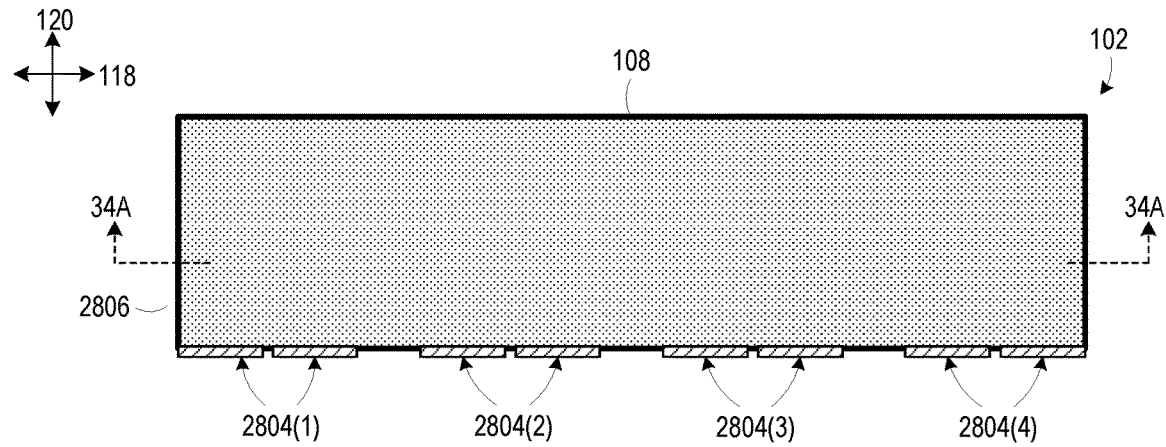
FIG. 30 is a front side elevational view of the FIG. 28 boosted coupled inductor.
Figure 31:
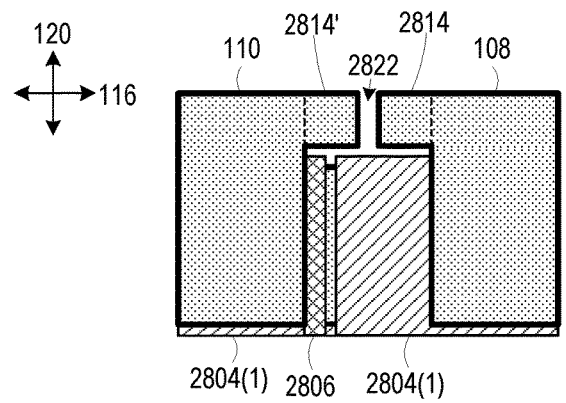
FIG. 31 is a left side elevational view of the FIG. 28 boosted coupled inductor.
Figure 32:
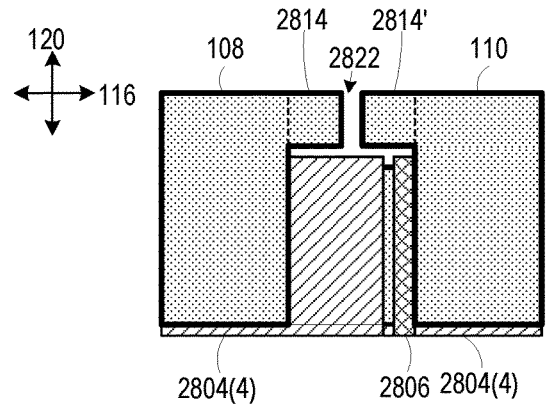
FIG. 32 is a right side elevational view of the FIG. 28 boosted coupled inductor.
Figure 33:
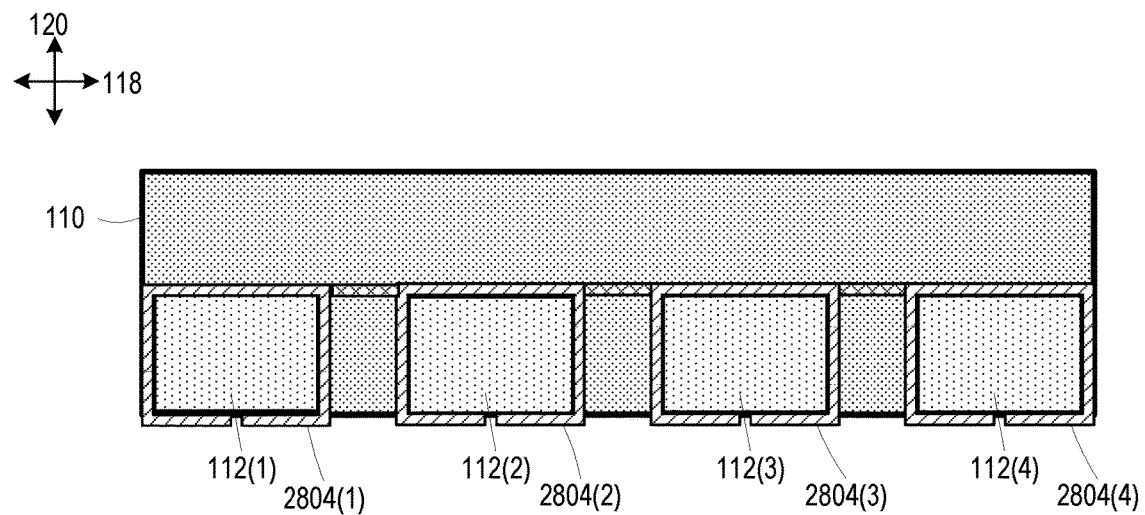
FIG. 33 is a cross-sectional view of the FIG. 28 boosted coupled inductor taken along line 33A-33A of FIG. 29.
Figure 34:
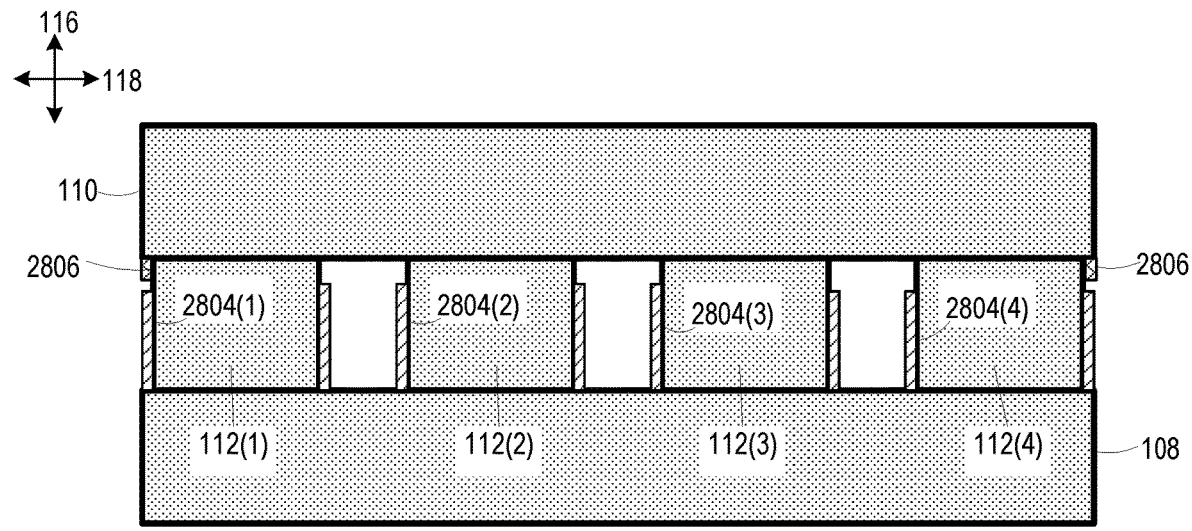
FIG. 34 is a cross-sectional view of the FIG. 28 boosted coupled inductor taken along line 34A-34A of FIG. 30.

FIG. 28 is a perspective view of a boosted coupled inductor 2800, which is an alternate embodiment of boosted coupled inductor 100 of FIG. 1. FIG. 29 is a top plan view of boosted coupled inductor 2800, FIG. 30 is a front side elevational view of boosted coupled inductor 2800, FIG. 31 is a left side elevational view of boosted coupled inductor 2800, and FIG. 32 is a right side elevational view of boosted coupled inductor 2800. FIG. 33 is a cross-sectional view of boosted coupled inductor 2800 taken along line 33A-33A of FIG. 29, and FIG. 34 is a cross-sectional view of boosted coupled inductor 2800 taken along line 34A-34A of FIG. 30. Boosted coupled inductor 2800 differs from boosted coupled inductor 100 in that (1) boosted coupled inductor includes a magnetic core 2802 in place of magnetic core 102, (2) boosted coupled inductor 2800 includes a plurality of phase windings 2804 in place of plurality of phase windings 104, and (3) boosted coupled inductor 2800 includes a boost winding 2806 in place of boost winding 106.

Magnetic core 2802 of FIG. 28 differs from magnetic core 102 of FIG. 1 in that magnetic core 2802 includes two leakage elements 2814 and 2814' in place of single leakage element 114. Each of leakage elements 2814 and 2814' is disposed between rails 108 and 110 in direction 116, and there is a gap 2822 between the two leakage elements in direction 116. Gap 2822 includes, for example, air, plastic, paper, adhesive, or a magnetic material having a lower magnetic permeability than magnetic core 2802. Leakage element 2814 is joined to first rail 108, and leakage element 2814' is joined to second rail 110. The figures include dashed lines delineating leakage element 2814 and 2814' from rails 108 and 110, respectively, to help a viewer distinguish the leakage elements from the rails. However, there need not be discontinuities between the rails and leakage elements.

Figure 35:
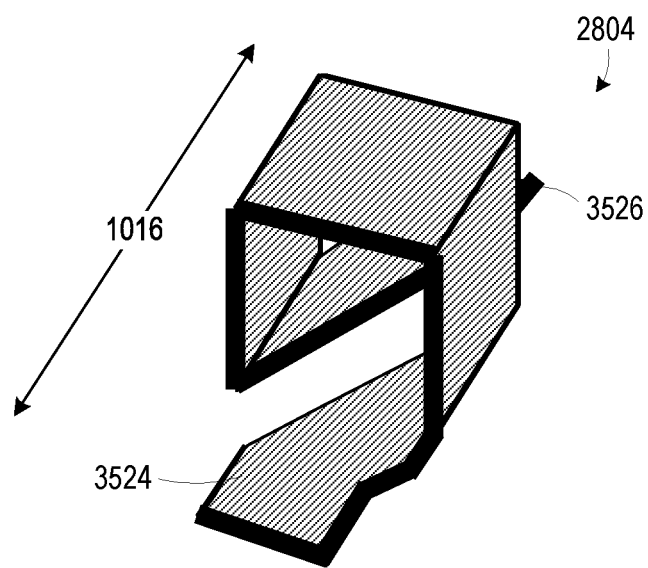
FIG. 35 is a perspective view of a phase winding of the FIG. 28 boosted coupled inductor.

Each phase windings 2804 is similar to phase winding 1004 of FIG. 10. FIG. 35 is a perspective view of a phase winding 2804 instance. Each phase winding 2804 forms opposing solder tabs 3524 and 3526 at respective ends of the winding. Boost winding 2806 is wound at least partially around all legs 112. However, in contrast with boost winding 106 of boosted coupled inductor 100, boost winding 2806 is not wound over the turns of phase windings 2804 in direction 120. Instead, boost winding 2806 is disposed beside phase windings 2804 in direction 116, i.e., boost winding 2806 is between the turns of phase windings 2804 and second rail 110 in direction 116. Nevertheless, boost winding 2806 is within the same magnetic flux paths as boost winding 106, and boost winding 2806 is therefore electrically equivalent to boost winding 106 from an inductive standpoint. Boost winding 2806 could alternately be disposed between first rail 108 and the turns of phase windings 2804 in direction 116.

Figure 36:
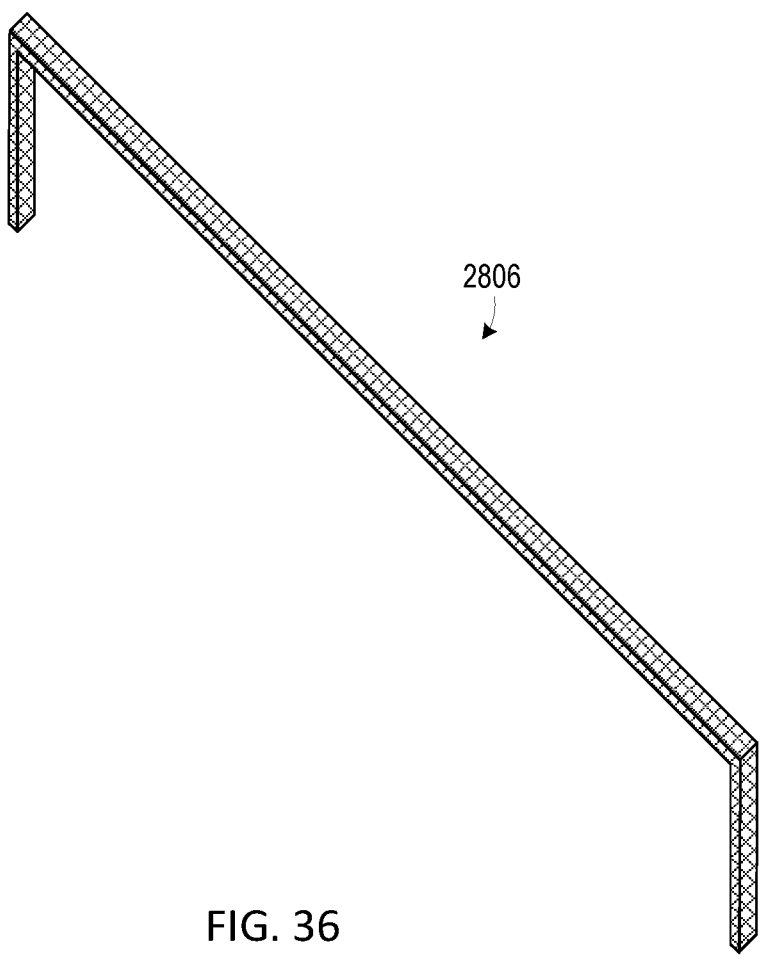
FIG. 36 is a perspective view of a boost winding of the FIG. 28 boosted coupled inductor.

FIG. 36 is a perspective view of boost winding 2806. Boost winding 2806 could be modified, for example, to form solder tabs or thru-hole pins at its opposing ends.

Figure 37:
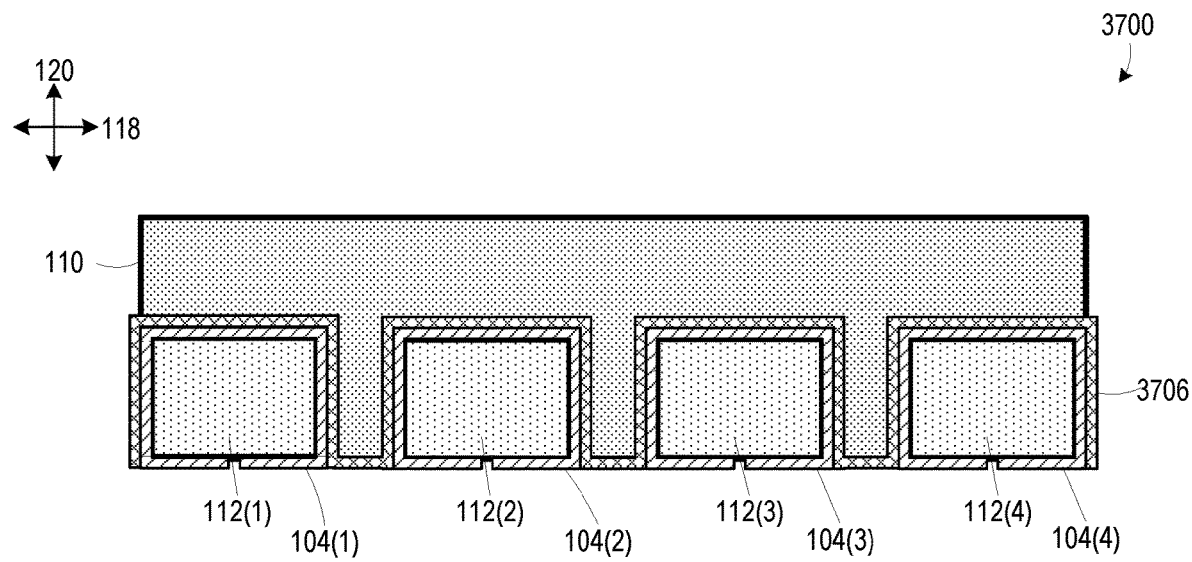
FIG. 37 is a cross-sectional view of another alternate embodiment of the FIG. 1 boosted coupled inductor.

FIG. 37 is a cross-sectional view of a boosted coupled inductor 3700, which is another alternate embodiment of boosted coupled inductor 100 of FIG. 1. The FIG. 37 cross-sectional view of boosted coupled inductor 3700 is analogous to the FIG. 6 cross-sectional view of boosted coupled inductor 100. Boosted coupled inductor 3700 differs from boosted coupled inductor 100 in that boosted coupled inductor 3700 includes a boost winding 3706 in place of boost winding 106. Boost winding 3706 is similar to boost winding 106 except that boost winding 3706 is wound around three sides of each leg 112, as shown in FIG. 37. Boost winding 3706 has essentially the same inductive characteristics as boost winding 106.

Figure 38:
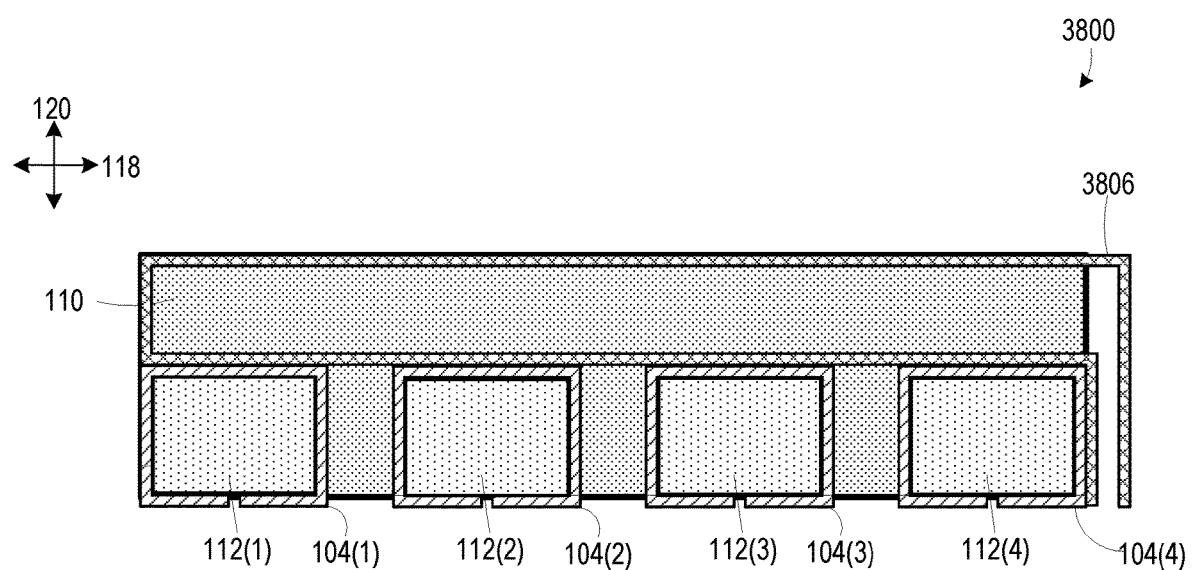
FIG. 38 is a cross-sectional view of another alternate embodiment of the FIG. 1 boosted coupled inductor.

FIG. 38 is a cross-sectional view of a boosted coupled inductor 3800, which is another alternate embodiment of boosted coupled inductor 100 of FIG. 1. The FIG. 38 cross-sectional view of boosted coupled inductor 3800 is analogous to the FIG. 6 cross-sectional view of boosted coupled inductor 100. Boosted coupled inductor 3800 differs from boosted coupled inductor 100 in that boosted coupled inductor 3800 includes a boost winding 3806 in place of boost winding 106. Boost winding 3808 is similar to boost winding 106 except that boost winding 3806 encloses essentially the entire cross-sectional area of second rail 110, as seen when boosted coupled inductor 3800 is viewed cross-sectionally in direction 116 (looking into the page of FIG. 38). Boost winding 3808 has essentially the same inductive characteristics as boost winding 106.

Figure 39:
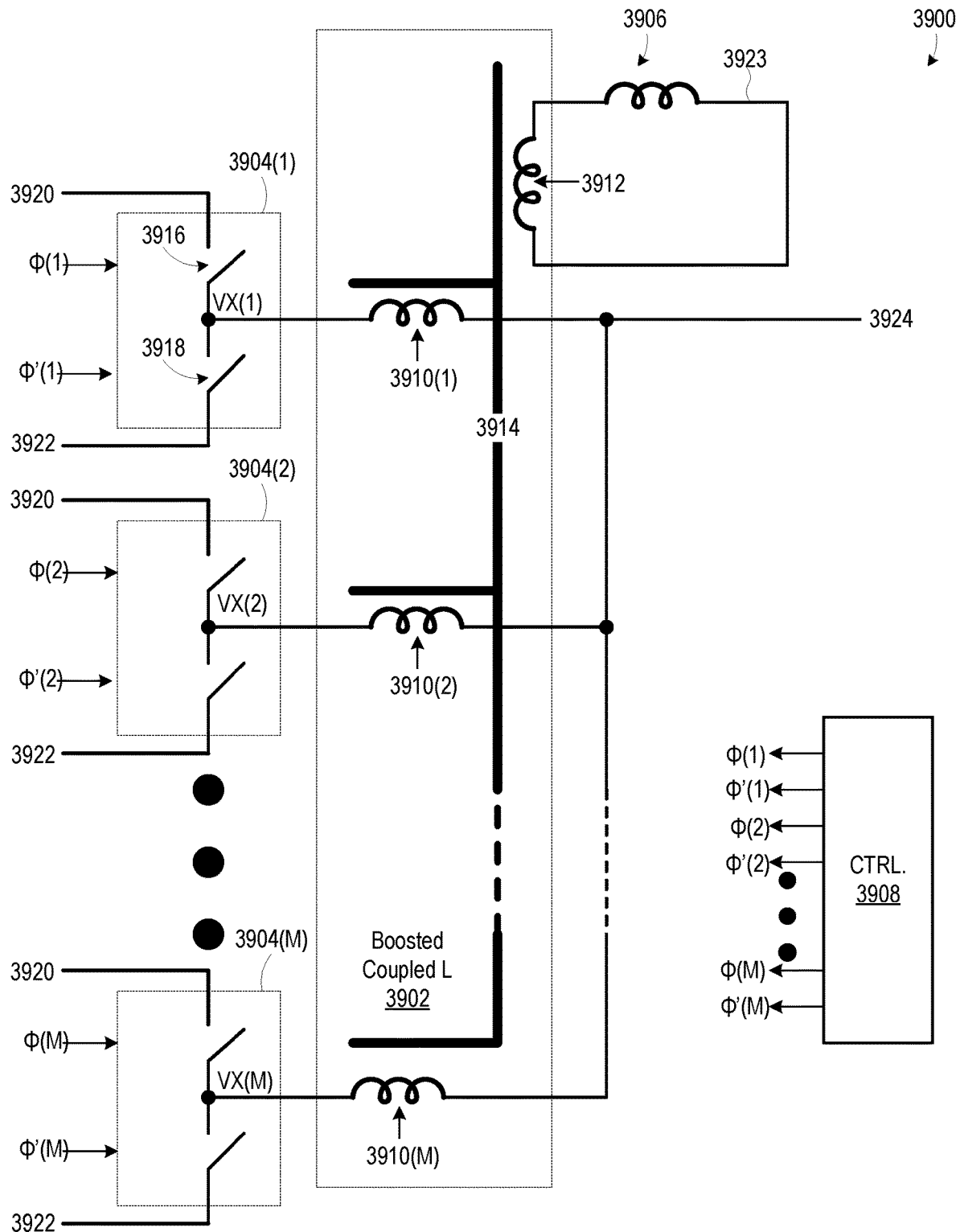
FIG. 39 is a schematic diagram of a switching power converter including a boosted coupled inductor, according to an embodiment.
Figure 40:
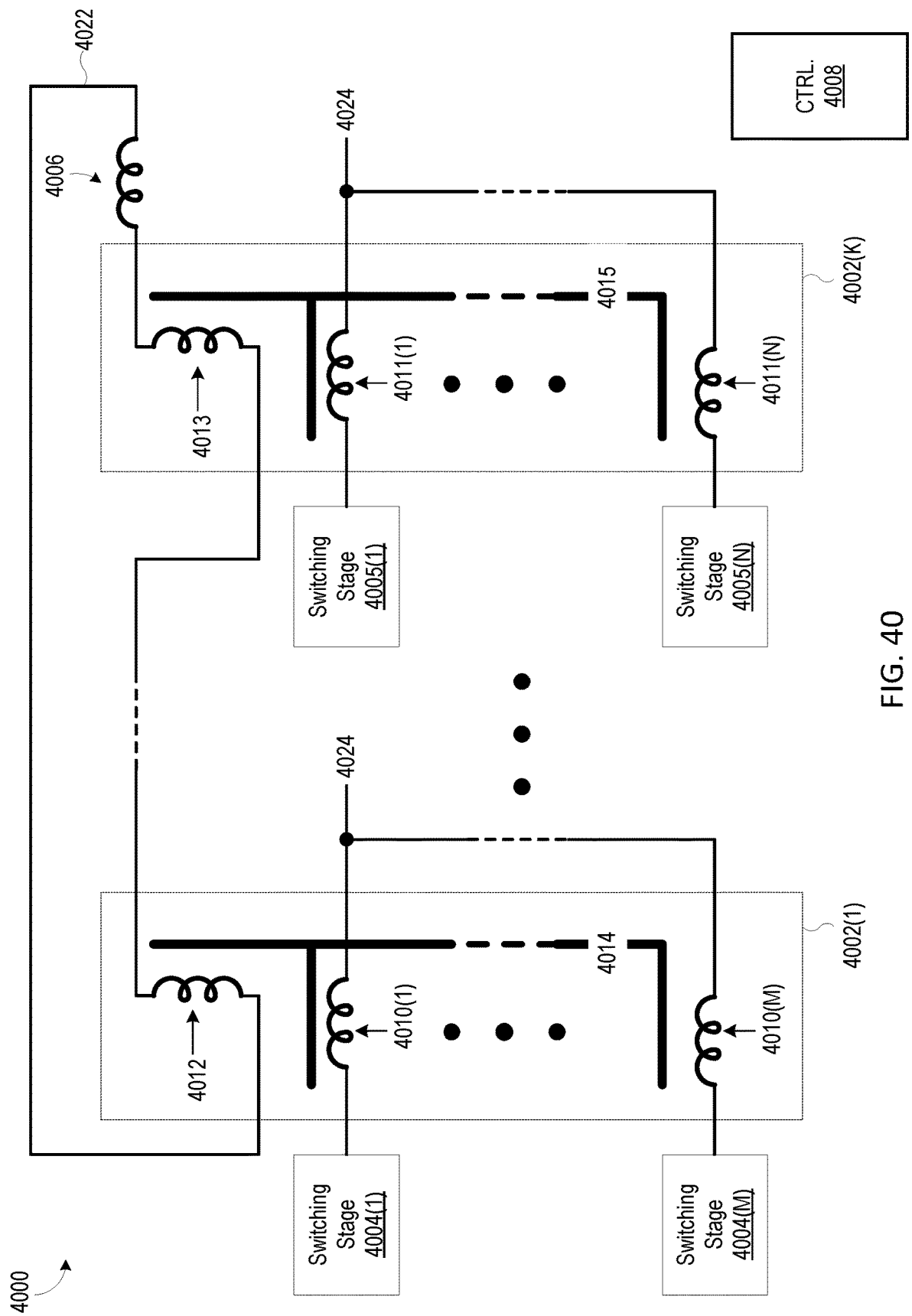
FIG. 40 is a schematic diagram of a switching power converter including a plurality of boosted coupled inductors, according to an embodiment.

One possible application of the boosted coupled inductors disclosed herein is in a switching power converter. For example, FIGS. 39 and 40 illustrate possible switching power converter applications of the boosted coupled inductors disclosed herein. However, it is understood that the boosted coupled inductors disclosed herein are not limited to these applications.

FIG. 39 is a schematic diagram of a switching power converter 3900, which includes a boosted coupled inductor 3902, a plurality of switching stages 3904, a tuning inductor 3906, and a controller 3908. Boosted coupled inductor 3902 includes M phase windings 3910, a boost winding 3912, and a magnetic core 3914, where M is an integer greater than one. Boosted coupled inductor 3902 is, for example, one of the boosted coupled inductors discussed above. For example, in one embodiment, boosted coupled inductor 3902 is an embodiment of boosted coupled inductor 100, where phase windings 3910 are phase windings 104, boost winding 3912 is boost winding 106, and magnetic core 3914 is magnetic core 102. As another example, in another embodiment, boosted coupled inductor 3902 is an embodiment of boosted coupled inductor 1600, where phase windings 3910 are phase windings 1604, boost winding 3912 is boost winding 1606, and magnetic core 3914 is magnetic core 1602. As yet another example, in another embodiment, M is equal to 2, boosted coupled inductor 3902 is an embodiment of boosted coupled inductor 2600, where phase windings 3910 are phase windings 2604 and 2606, boost winding 3912 is boost winding 2608, and magnetic core 3914 is magnetic core 2602.

Each phase winding 3910 is electrically coupled to a respective switching stage 3904 at a switching node VX. Each switching stage 3904 includes a respective first switching device 3916 and a respective second switching device 3918 electrically coupled at a switching node VX, although only one instance of each of switching devices 3916 and 3918 are labeled in FIG. 39 for illustrative clarity. First and second switching devices 3916 and 3918 are, for example, transistors, such as field effect transistors (FETs) or bipolar junction transistors (BJTs). Additionally, either first switching devices 3916 or second switching devices 3918 could be replaced with respective diodes. Each first switching device 3916 is controlled by a respective control signal φ generated by controller 3908, and each second switching device 3918 is controlled by a respective control signal φ' generated by controller 3908. In some embodiments, controller 3908 is configured to generate control signals φ and φ' to control switching of switching stages 3904 to regulate on or more parameters of switching power converter 3900, such as voltage at one of nodes 3920, 3922, or 3924, or current flowing into or out of one or more nodes of 3920, 3922, 3924. In certain embodiments, controller 3908 is configured to generate control signals ϕ and ϕ' using pulse width modulation (PWM), pulse frequency modulation (PFM), or another modulation technique. Controller 3908 is optionally additionally configured to generate control signals ϕ and ϕ' for a given switching stage 3904 in an essentially complementary manner, such that second switching device 3918 is in its off-state while first switching device 3916 is in its on-state, and vice versa, with optional deadtime between switching states to prevent shoot through.

Boost winding 3912 and tuning inductor 3906 are electrically coupled in series via a node 3923. In some embodiments, node 3923 is a reference node of switching power converter 3900. For example, node 3923 could be a ground plane of switching power converter 3900.

In some embodiments, node 3920 is an input power node, node 3922 is a reference node, and node 3924 is an output power node, such that switching power converter 3900 has a buck topology. However, switching power converter 3900 could be configured to have an alternate topology. For example, in some embodiments, node 3924 is an input power node, node 3920 is an output power node, and node 3922 is a reference node, such that switching power converter 3900 has a boost topology. In some alternate embodiments, tuning inductor 3906 is omitted such that both terminals of boost winding 3912 are electrically coupled to node 3922. Switching power converter 3900 could include additional components without departing from the scope hereof. For example, some embodiments further include a respective capacitor (not shown) electrically coupled to each of nodes 3920 and 3924, such as to provide a path for ripple current and/or to help support transient loads.

It may be particularly beneficial for M to be relatively large, e.g. for M to be three or greater. Specifically, presence of boost winding 3912 promotes good transient response of switching power converter 3900, i.e. ability of switching power converter 3900 to rapidly adjust to changes in its load. However, presence of boost winding 3912 increases ripple current magnitude relative to an otherwise similar switching power converter without boost winding 3912. Large ripple current magnitude is generally undesirable because it contributes to losses in switching power converter 3900, as well as to ripple voltage on an output power node. Increasing the inductance value of tuning inductor 3906 helps reduce ripple current magnitude, but increasing the inductance value also degrades transient response of switching power converter 3900. Therefore, there is a large tradeoff between transient response and efficiency when M is small, i.e. when M is less than or equal to two. Specifically, good transient response can be realized if tuning inductor 3906 has a small inductance value, but ripple current magnitude will be large. Conversely, small ripple current magnitude can be realized if tuning inductor 3906 has a large inductance value, but transient response will be poor.

Applicant has determined, however that increasing M enables switching power converter 3900 to achieve both good transient response and ripple current magnitude, because ripple current magnitude decreases with increasing number of phase windings 3910. Consequently, configuring boosted coupled inductor 3902 to have a large number of phase windings 3910, e.g. at least three phase windings 3910, advantageously helps switching power converter 3900 overcome the increase in ripple current magnitude associated with presence of boost winding 3912. Therefore, tuning inductor 3906 can be configured to have a small inductance value (or even omitted) to promote good transient response, while boosted coupled inductor 3902 can be configured to have a large number of phases to minimize ripple current magnitude. Accordingly, it may be particularly beneficial for boosted coupled inductor 3902 to be embodied by a boosted coupled inductor capable of including at least three phase windings. Boosted coupled inductors 100 and 1600 are scalable and can therefore include a large number of phase windings, while boosted coupled inductor 2600 is limited to two phase windings.

Furthermore, switching power converter 3900 could be modified to include one or more additional boosted coupled inductors. For example, FIG. 40 is a schematic diagram of a switching power converter 4000 which includes K boosted coupled inductors, switching stages 4004 and 4005, a tuning inductor 4006, and a controller 4008, where K is an integer greater than one. Boosted coupled inductor 4002(1) includes M phase windings 4010, a boost winding 4012, and a magnetic core 4014, where M is an integer greater than one. Boosted coupled inductor 4002(K) includes N phase windings 4011, a boost winding 4013, and a magnetic core 4015, where N is an integer greater than one. Any other boosted coupled inductors 4002 (not shown) of switching power converter 4000 may have a similar configuration. Boosted coupled inductors 4002 are, for example, embodiments of one or more of the boosted coupled inductors discussed above. The number of phase windings may vary among boosted coupled inductor 4002 instances. For example, in some embodiments N is equal to M, and in some other embodiments, N is not equal to M. Ripple current magnitude decreases with increasing number of boosted coupled inductors 4002, as well as with number of phases windings 4010, 4011 within each boosted coupled inductor. Such ripple current reduction could advantageously result in an efficiency improvement, or it could be traded off for other benefits, such as improved converter transient response.

A respective switching stage is electrically coupled to each phase winding. For example, a respective switching stage 4004 is electrically coupled to each phase winding 4010, and a respective switching stage 4005 is electrically coupled to each phase winding 4011. Details of switching stages 4004 and 4005 are not shown, but in some embodiments, each of switching stages 4004 and 4005 is configured similar to switching stages 3904 of FIG. 39. Controller 4008 is configured to generate control signals (not shown) to control switching stages of switching power converter 4000, e.g. switching stages 4004 and 4005, in a manner analogous to that discussed above with respect to controller 3908 of FIG. 39.

Each phase winding, e.g. 4010 and 4011, is electrically coupled between a respective switching stage, e.g. 4004 or 4005, and a node 4024. In some embodiments, node 4024 is an output power node such that switching power converter 4000 has a buck topology, and in some other embodiments, node 4024 is an input power node such that switching power converter 4000 has a boost topology. However, switching power converter 4000 could have a different topology without departing from the scope hereof. Boost windings, e.g. 4012 and 4013, of each boosted coupled inductor 4002 are optionally electrically coupled in series with tuning inductor 4006, such as via node 4022, illustrated in FIG. 40. In some embodiments, node 4022 is a reference node, e.g., a ground plane of switching power converter 4000. In some alternate embodiments, tuning inductor 4006 is omitted such that boost windings are electrically coupled in series via node 4022. Switching power converter 4000 could include additional components without departing from the scope hereof.

For example, some embodiments further include a capacitor (not shown) electrically coupled to node 4024, such as to provide a path for ripple current and/or to help support transient loads.

Combinations of Features

Features described above may be combined in various ways without departing from the scope hereof. The following examples illustrate some possible combinations.

(A1) A switching power converter includes (1) a first switching stage, (2) a second switching stage, (3) a coupled inductor, and (4) a boost winding. The coupled inductor includes a first phase winding, a second phase winding, and a magnetic core. The first phase winding is wound at least partially around a first portion of the magnetic core, and the first phase winding is electrically coupled to the first switching stage. The second phase winding is wound at least partially around a second portion of the magnetic core, and the second phase winding is electrically coupled to the second switching stage. The boost winding forms at least one turn such that mutual magnetic flux associated with each of the first and second phase windings flows through the at least one turn.

(A2) The switching power converter denoted as (A1) may further include a third switching stage. The coupled inductor may further include a third phase winding wound at least partially around a third portion of the magnetic core, where the third phase winding is electrically coupled to the third switching stage. The boost winding may form at least one turn such that mutual magnetic flux associated with each of the first, second, and third phase windings flows through the at least one turn.

(A3) In any one of the switching power converters denoted as (A1) and (A2), the first portion of the magnetic core may include a first leg of the magnetic core, the second portion of the magnetic core may include a second leg of the magnetic core, and the boost winding may be wound around each of the first and second legs.

(A4) In the switching power converter denoted as (A3), the magnetic core may further include first and second rails separated from each other in a first direction, each leg of the first and second legs may be disposed between the first and second rails in the first direction, and the first and second legs may be separated from each other in a second direction that is orthogonal to the first direction.

(A5) In the switching power converter denoted as (A4), each of the first and second phase windings may be at least partially surrounded by the boost winding, as seen when the coupled inductor is viewed cross-sectionally in the first direction.

(A6) In any one of the switching power converters denoted as (A4) and (A5), the magnetic core may further include one or more leakage elements disposed between the first and second rails in the first direction, and the one or more leakage elements may be disposed over the boost winding in a third direction, the third direction being orthogonal to each of the first direction and the second direction.

(A7) In the switching power converter denoted as (A6), a first leakage element may be attached to the first rail, and the first leakage element may be separated from the second rail in the first direction by a gap.

(A8) In the switching power converter denoted as (A1), (1) the magnetic core may form a passageway extending through the magnetic core in a first direction, (2) the first phase winding may be wound through the passageway, (3) the second phase winding may be wound through the passageway, the (4) second phase winding may be separated from the first phase winding in the passageway in a second direction that is orthogonal to the first direction, and (5) the boost winding may be wound through passageway, such that the boost winding is disposed between the first and second phase windings in the second direction.

(A9) In the switching power converter denoted as (A8), the passageway may have a height in a third direction where the third direction is orthogonal to each of the first and second directions, the passageway may have a width in the second direction, and the height of the passageway may vary along the width of the passageway such that the height of the passageway at the boost winding is less than the height of the passageway at each of the first and second phase windings.

(A10) Any one of the switching power converters denoted as (A1) through (A9) may further include a controller configured to control switching of at least the first and second switching stages.

(B1) A switching power converter includes a first boosted coupled inductor and a second boosted coupled inductor. The first boosted coupled inductor includes M phase windings and a first boost winding, where the first boost winding forms at least one first turn such that mutual magnetic flux associated with each of the M phase windings flows through the at least one first turn, and M is an integer greater than one. The second boosted coupled inductor includes N phase windings and a second boost winding, where the second boost winding forms at least one second turn such that mutual magnetic flux associated with each of the N phase windings flows through the at least one second turn, and N is an integer greater than one. The switching power converter further includes a respective switching stage electrically coupled to each of the M phase windings and a respective switching stage electrically coupled to each of the N phase windings. The first and second boost windings are electrically coupled in series.

(B2) In the switching power converter denoted as (B1), N may be equal to M.

(B3) In the switching power converter denoted as (B1), N may be different from M.

(B4) Any one of the switching power converters denoted as (B1) through (B3) may further include a controller configured to control switching of at least (1) each switching stage electrically coupled to each of the M phase windings and (2) each switching stage electrically coupled to each of the N phase windings.

(C1) A boosted coupled inductor includes (a) a magnetic core including a plurality of legs, (b) a respective phase winding wound at least partially around each leg of the plurality of legs, and (c) a boost winding wound at least partially around each of the plurality of legs.

(C2) In the boosted coupled inductor denoted as (C1), the magnetic core may further include first and second rails separated from each other in a first direction, (C2) each leg of the plurality of legs may be disposed between the first and second rails in the first direction, and (3) the plurality of legs may be separated from each other in a second direction that is orthogonal to the first direction.

(C3) In the boosted coupled inductor denoted as (C2), each phase winding may be at least partially surrounded by the boost winding, as seen when the coupled inductor is viewed cross-sectionally in the first direction.

(C4) In the boosted coupled inductor denoted as (C2), the boost winding may be disposed beside the respective phase windings wound around the plurality of legs.

(C5) In any one of the boosted coupled inductors denoted as (C2) through (C4), the magnetic core may further include one or more leakage elements disposed between the first and second rails in the first direction, and the one or more leakage elements may be disposed over the boost winding in a third direction, the third direction being orthogonal to each of the first direction and the second direction.

(C6) In the boosted coupled inductor denoted as (C5), a first leakage element may be attached to the first rail, and the first leakage element may be separated from the second rail in the first direction by a gap.

(D1) A boosted coupled inductor includes (1) a coupled inductor including a first phase winding and a second phase winding, (2) a magnetic core, and (3) a boost winding. The magnetic core forms a passageway extending through the magnetic core in a first direction, and the first and second phase windings are wound through the passageway. The second phase winding is separated from the first phase winding in the passageway in a second direction that is orthogonal to the first direction. The boost winding is wound through the passageway, such that the boost winding is disposed between the first and second phase windings in the second direction.

(D2) In the boosted coupled inductor denoted as (D1), the passageway may have a height in a third direction, the third direction being orthogonal to each of the first and second directions, the passageway may have a width in the second direction, and the height of the passageway may vary along the width of the passageway such that the height of the passageway at the boost winding is less than the height of the passageway at each of the first and second phase windings.

Changes may be made in the above boosted coupled inductors, systems, and methods without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present boosted coupled inductors, systems, and methods, which, as a matter of language, might be said to fall therebetween.

What is claimed is:

1. A switching power converter, comprising:
    a first switching stage;
    a second switching stage;
    a coupled inductor, including:
        a first phase winding,
        a second phase winding, and
        a magnetic core,
        the first phase winding being wound at least partially around a first portion of the magnetic core, the first phase winding being electrically coupled to the first switching stage, and
        the second phase winding being wound at least partially around a second portion of the magnetic core, the second phase winding being electrically coupled to the second switching stage; and
    a boost winding forming at least one turn such that mutual magnetic flux associated with each of the first and second phase windings flows through the at least one turn;
    wherein:
        the first portion of the magnetic core comprises a first leg of the magnetic core,
        the second portion of the magnetic core comprises a second leg of the magnetic core,
        the boost winding is wound around each of the first and second legs,
        the magnetic core further includes first and second rails separated from each other in a first direction,
        each leg of the first and second legs is disposed between the first and second rails in the first direction, and
        the first and second legs are separated from each other in a second direction that is orthogonal to the first direction.

2. The switching power converter of claim 1, wherein each of the first and second phase windings is at least partially surrounded by the boost winding, as seen when the coupled inductor is viewed cross-sectionally in the first direction.

3. The switching power converter of claim 2, wherein:
    the magnetic core further includes a leakage element disposed between the first and second rails in the first direction; and
    the leakage element is disposed over the boost winding in a third direction, the third direction being orthogonal to each of the first direction and the second direction.

4. The switching power converter of claim 3, wherein:
    the leakage element is attached to the first rail; and
    the leakage element is separated from the second rail in the first direction by a gap.

5. The switching power converter of claim 1, further comprising a third switching stage, wherein:
    the coupled inductor further includes a third phase winding wound at least partially around a third portion of the magnetic core, the third phase winding being electrically coupled to the third switching stage; and
    the boost winding forms the at least one turn such that mutual magnetic flux associated with each of the first, second, and third phase windings flows through the at least one turn.

6. The switching power converter of claim 1, further comprising a controller configured to control switching of at least the first and second switching stages.

7. A switching power converter, comprising:
    a first switching stage;
    a second switching stage;
    a coupled inductor, including:
        a first phase winding,
        a second phase winding, and
        a magnetic core,
        the first phase winding being wound at least partially around a first portion of the magnetic core, the first phase winding being electrically coupled to the first switching stage, and
        the second phase winding being wound at least partially around a second portion of the magnetic core, the second phase winding being electrically coupled to the second switching stage; and
    a boost winding forming at least one turn such that mutual magnetic flux associated with each of the first and second phase windings flows through the at least one turn;
    wherein:
        the magnetic core forms a passageway extending through the magnetic core in a first direction,
        the first phase winding is wound through the passageway,
        the second phase winding is wound through the passageway, the second phase winding being separated from the first phase winding in the passageway in a second direction that is orthogonal to the first direction, and the boost winding is wound through passageway, such that the boost winding is disposed between the first and second phase windings in the second direction.

8. The switching power converter of claim 7, wherein:
the passageway has a height in a third direction, the third direction being orthogonal to each of the first and second directions;
the passageway has a width in the second direction; and
the height of the passageway varies along the width of the passageway such that the height of the passageway at the boost winding is less than the height of the passageway at each of the first and second phase windings.

9. A switching power converter, comprising:
a first boosted coupled inductor including M phase windings and a first boost winding, the first boost winding forming at least one first turn such that mutual magnetic flux associated with each of the M phase windings flows through the at least one first turn, M being an integer greater than one;
a respective switching stage electrically coupled to each of the M phase windings;
a second boosted coupled inductor including N phase windings and a second boost winding, the second boost winding forming at least one second turn such that mutual magnetic flux associated with each of the N phase windings flows through the at least one second turn, N being an integer greater than one; and
a respective switching stage electrically coupled to each of the N phase windings;
wherein the first and second boost windings are electrically coupled in series.

10. The switching power converter of claim 9, where N is equal to M.

11. The switching power converter of claim 9, where N is not equal to M.

12. The switching power converter of claim 9, further comprising a controller configured to control switching of at least (a) each switching stage electrically coupled to each of the M phase windings and (b) each switching stage electrically coupled to each of the N phase windings.

13. A boosted coupled inductor, comprising: a magnetic core including (a) a plurality of legs, (b) a first rail, and (c) a second rail, the first and second rails being separated from each other in a first direction, each leg of the plurality of legs being disposed between the first and second rails in the first direction, and the plurality of legs being separated from each other in a second direction that is orthogonal to the first direction; a respective phase winding wound at least partially around each leg of the plurality of legs; and a boost winding wound at least partially around each of the plurality of legs, wherein: the magnetic core further includes a leakage element disposed between the first and second rails in the first direction;

the leakage element is disposed over the boost winding in a third direction, the third direction being orthogonal to each of the first direction and the second direction; the leakage element is attached to the first rail; and the leakage element is separated from the second rail in the first direction by a gap.

14. The boosted coupled inductor of claim 3, wherein each phase winding is at least partially surrounded by the boost winding, as seen when the coupled inductor is viewed cross-sectionally in the first direction.

* * * * *